United States Patent
Yu et al.

(10) Patent No.: US 8,639,430 B2
(45) Date of Patent: *Jan. 28, 2014

(54) ENERGY CONSERVATION SYSTEMS AND METHODS

(75) Inventors: Jeffrey N. Yu, Honolulu, HI (US);
James W. Hill, Mission Viejo, CA (US);
Gregory W. Davis, Frankenmuth, MI (US)

(73) Assignee: Fuel Saving Technologies, LLC, Honolulu, HI (US)

( * ) Notice: Subject to any disclaimer, the term of this patent is extended or adjusted under 35 U.S.C. 154(b) by 366 days.

This patent is subject to a terminal disclaimer.

(21) Appl. No.: 12/986,128

(22) Filed: Jan. 6, 2011

(65) Prior Publication Data
US 2011/0125294 A1 May 26, 2011

Related U.S. Application Data

(63) Continuation-in-part of application No. 12/497,507, filed on Jul. 2, 2009, now Pat. No. 7,983,830.

(60) Provisional application No. 61/292,823, filed on Jan. 6, 2010, provisional application No. 61/078,281, filed on Jul. 3, 2008.

(51) Int. Cl.
*F02B 63/04* (2006.01)
*F02B 63/00* (2006.01)

(52) U.S. Cl.
USPC .............................................. 701/102; 123/3

(58) Field of Classification Search
USPC .......... 701/102, 103, 104, 105; 123/2, 3, 299, 123/300, 304; 180/65.245, 65.25, 65.21, 180/65.285
See application file for complete search history.

(56) References Cited

U.S. PATENT DOCUMENTS

| | | | |
|---|---|---|---|
| 4,062,419 A | 12/1977 | Kadota | |
| 4,078,631 A | 3/1978 | Kadota | |
| 4,408,293 A | 10/1983 | Avins | |
| 4,473,882 A | 9/1984 | Suzuki et al. | |
| 5,722,359 A | 3/1998 | Chubachi et al. | |
| 5,806,617 A | 9/1998 | Yamaguchi | |
| 5,841,201 A | 11/1998 | Tabata et al. | |
| 5,842,534 A | 12/1998 | Frank | |

(Continued)

FOREIGN PATENT DOCUMENTS

| | | |
|---|---|---|
| CN | 102144085 | 8/2011 |
| DE | 102004017115 | 10/2005 |

(Continued)

OTHER PUBLICATIONS

International Preliminary Report on Patentability for PCT application PCT/US2009/049640, dated Aug. 27, 2009, in 8 pages.

(Continued)

*Primary Examiner* — Mahmoud Gimie
(74) *Attorney, Agent, or Firm* — Knobbe, Martens, Olson & Bear, LLP

(57) ABSTRACT

Methods and systems are described for conserving energy used by an energy consuming device. In certain embodiments, an energy conservation system can be configured to deliver energy to the energy consuming device for a period, followed by a period where energy delivery is dampened and/or cut. By cycling the delivery of energy in this fashion, the energy conservation can achieve a pulsed efficiency.

20 Claims, 16 Drawing Sheets

(56) References Cited

U.S. PATENT DOCUMENTS

| | | | |
|---|---|---|---|
| 5,907,191 A * | 5/1999 | Sasaki et al. | 290/19 |
| 5,936,312 A * | 8/1999 | Koide et al. | 290/40 R |
| 5,991,683 A * | 11/1999 | Takaoka et al. | 701/102 |
| 6,009,965 A | 1/2000 | Takanohashi et al. | |
| 6,016,457 A | 1/2000 | Toukura et al. | |
| 6,054,844 A | 4/2000 | Frank | |
| 6,087,734 A * | 7/2000 | Maeda et al. | 290/40 C |
| 6,098,733 A | 8/2000 | Ibaraki et al. | |
| 6,314,359 B1 | 11/2001 | Janic et al. | |
| 6,401,022 B2 | 6/2002 | Kubota et al. | |
| 6,702,053 B2 | 3/2004 | Nogi et al. | |
| 6,745,747 B2 | 6/2004 | Surnilla | |
| 6,809,429 B1 | 10/2004 | Frank | |
| 6,945,905 B2 | 9/2005 | Tamai et al. | |
| 6,991,052 B2 | 1/2006 | Nogi et al. | |
| 6,998,727 B2 | 2/2006 | Gray | |
| 7,591,130 B2 | 9/2009 | Ito | |
| 7,983,830 B2 | 7/2011 | Yu et al. | |
| 8,380,421 B2 * | 2/2013 | Yu et al. | 701/102 |
| 2001/0037905 A1 | 11/2001 | Nogi et al. | |
| 2006/0100057 A1 * | 5/2006 | Severinsky et al. | 477/4 |
| 2007/0105689 A1 | 5/2007 | Arai | |
| 2008/0229226 A1 | 9/2008 | Rowbottom et al. | |
| 2009/0063007 A1 * | 3/2009 | Masuda | 701/102 |
| 2009/0118939 A1 | 5/2009 | Heap et al. | |
| 2009/0259354 A1 | 10/2009 | Krupadanam et al. | |
| 2010/0204896 A1 | 8/2010 | Biondo et al. | |
| 2013/0103238 A1 | 4/2013 | Yu et al. | |

FOREIGN PATENT DOCUMENTS

| | | |
|---|---|---|
| EP | 2315929 | 5/2011 |
| KR | 10-2009-0118352 | 11/2009 |
| WO | WO 2007/092711 | 8/2007 |
| WO | WO 2013/059682 | 4/2013 |

OTHER PUBLICATIONS

International Search Report and Written Opinion for PCT application No. PCT/US2012/061146, mailed on Mar. 18, 2013, by Joong Sub Han.

Supplementary European Search Report for European Application No. EP 09774585, dated May 27, 2013, by Frederic Granier.

International Search Report and Written Opinion for PCT application PCT/US2009/049640, dated Aug. 27, 2009.

* cited by examiner

ENERGY CONSERVATION SYSTEMS AND METHODS

CROSS-REFERENCES TO RELATED APPLICATIONS

This application claims the benefit of U.S. Provisional Patent Application Ser. No. 61/292,823, entitled "Energy Conservation Systems and Methods," filed on Jan. 6, 1010; this application is also a continuation-in-part application of U.S. patent application Ser. No. 12/497,507, entitled "Fuel Conservation Systems and Methods," filed on Jul. 2, 2009, which claims the benefit of U.S. Provisional Patent Application Ser. No. 61/078,281, entitled "Fuel Conservation Systems and Methods," filed on Jul. 3, 2008; all of the foregoing priority applications are hereby incorporated by reference in their entirety for all purposes.

FIELD OF THE INVENTION

Embodiments of the inventions generally relate to energy-consuming devices and energy conservation systems and methods.

BACKGROUND OF THE INVENTION

Energy, whether it be electricity, fossil fuels, or the like, allow for production and delivery of food and products worldwide. From cargo ships to diesel locomotives, tractor-trailers, and the everyday automobile, the world runs on combustible gas, and typically fossil fuel or other energy sources. As nations move toward securing prosperity for their people, as attempts are made for an increased standard of living, as machines of industry continue to produce articles of need and want, the market for oil steadily grows. Gasoline prices will continue to rise if demand depletes oil reserves. A rise in fuel costs comes with staggering consequences, including a corresponding rise in the cost to make and deliver food and products. Many rational observers argue that the safety, security, and well-being of entire generations hangs at a precipice of near-total reliance upon fossil fuels.

Internal combustion engines depend upon the availability of fossil fuels. The first internal combustion engine was perhaps contemplated by Al-Jazari in 1206. In *The Book of Knowledge of Ingenious Mechanical Devices*, he described a reciprocating pump and crankshaft device. Leonardo da Vinci described a compressionless engine in the 16th century. A patent for an internal combustion engine for industrial applications was granted to Samuel Brown in 1823. A modern search of patents and patent applications reveals a proliferation of interest in the field of internal combustion engines, yet another metric useful for describing the demands that are pressing in from all sides, causing the price of gas to reach astronomical heights.

SUMMARY OF THE INVENTION

In accordance with certain embodiments, an energy conservation system and method for devices or energy consuming devices is provided. In some embodiments, the energy may comprise fuel. In some embodiments, the device or energy consuming device may comprise an engine such as an internal combustion engine. In certain embodiments the energy conservation system and method may apply to a cruise control module, a programmable logic controller, and/or a device control unit. Certain embodiments may dampen and/or cut energy delivery to a device or an energy consuming device. In certain embodiments an electric motor may substantially maintain a horsepower or torque output of an internal combustion engine when reducing, moderating, tapering, oscillating, cycling, cutting and/or dampening energy delivery to a device or an energy consuming device. Certain embodiments may be selectively tunable, and may include a feedback loop to display information relative to the possibility of and/or achievement of energy savings. Certain embodiments of the inventions may include a user-selectable override, causing the device or energy consuming device to make available, on demand from a user, the greatest amount of output power possible from the device.

In a certain embodiment, a method is provided for conserving energy used by a device. The method includes receiving as an input to a device power module a first function comprising a user-specified power output of a device over a time duration. In certain embodiments, the input may come from an accelerator pedal or throttle position. In certain embodiments, the time duration may be instantaneous. The method includes processing the first function into a second function comprising a directive power output of the device over the time duration. The second function has at least one region of equal or increased device power output relative to the user-specified device power output, and the second function also has at least one region of decreased device power output relative to the user-specified device power output, so that, if the device outputs power equal to the directive power output of the device over the time duration, the device consumes less energy than the device would have consumed if the device outputted power equal to the user-specified power output of the device over the time duration. The method includes outputting, to a device control module, the second function, such that the device outputs power according to the directive power output of the device over the time duration.

In a certain embodiment, the method includes displaying to a user an indication of a possibility or achievement of energy savings by the device if the device outputs power according to the directive power output of the device. In a certain embodiment, the method includes providing an actuator that permits the user to override the energy savings. In a certain embodiment, the method includes the aspect of the input to the device power module including a cruise-control setting by a user. In a certain embodiment, the method includes the aspect of the user-specified power output of the device being based on a cruise-control setting by a user. In a certain embodiment, the method includes supplementing an output of the device with output generated by an electric motor while the device outputs power according to the directive power output of the device. In a certain embodiment, the method includes supplementing a power output of the device with power from an electric motor while the device outputs power according to the directive power output of the device. In a certain embodiment, the method includes processing the second function for smoothness. In a certain embodiment, the method includes supplementing a power output of the device with power from a motor different from the device while the device outputs power according to the directive power output of the device. In a certain embodiment, the processing of the first function into the second function includes application of a transform T, such that $F_2(n)=TF_1(n)$, where $F_2$ is the second function; $F_1$ is the first function; n is an ordered index number of an nth discrete sample, where $n \in \{0, 1, 2, \ldots \infty\}$; and wherein T comprises $(ke^{-2\pi i \Omega(n-d)} - Z)$, where k is a constant; e is an exponential; i is the imaginary number $\sqrt{-1}$; $\Omega$ is a frequency of cycles per sample interval (e.g., the time interval between the nth and the n+1th sample); Z is a constant; and d is a delay constant.

In a certain embodiment, a device control system includes means for receiving, as an input, a first function comprising a user-specified power output of a device over a time duration. In some embodiments, the system includes means for processing the first function into a second function comprising a directive power output of the device over the time duration. The system includes the second function having at least one region of equal or increased device power output relative to the user-specified device power output, and at least one region of decreased device power output relative to the user-specified device power output, such that, if the device outputs power equal to the directive power output of the device over the time duration, the device consumes less energy than the device would have consumed if the device outputted power equal to the user-specified power output of the device over the time duration. The system includes means for outputting, to a device control module, the second function, such that the device outputs power according to the directive power output of the device over the time duration.

In a certain embodiment, the system includes means for informing the user of a possibility or achievement of energy saving by the device if the device outputs power according to the directive power output of the device. In a certain embodiment, the system includes means for supplementing an output of the device with output generated by a motor different from the device during outputting of the second function. In a certain embodiment, the motor comprises an electric motor. In a certain embodiment, the system Includes the aspect that the input comprises a cruise-control setting by a user. In a certain embodiment, the system includes the aspect that the user-specified power output of the device is based on a cruise-control setting by a user. In a certain embodiment, the system includes means for outputting the second function for a duration of time greater than a duration of time that the input is input to the means for receiving. In a certain embodiment, the system includes means for processing the second function for smoothness. In a certain embodiment, the system includes means for supplementing an output of the device with output generated by a motor different from the device during outputting of the second function. In a certain embodiment the system includes an electric motor. In a certain embodiment, the means for processing the first function into the second function comprises application of a transform T, such that $F_2(n)=TF_1(n)$, where $F_2$ is the second function; $F_1$ is the first function; and n is an ordered index number of an nth discrete sample, where $n \in \{0, 1, 2, \ldots \infty\}$; and wherein T comprises $(ke^{-2\pi i\Omega(n-d)}-Z)$, where k is a constant; e is an exponential; i is the imaginary number $\sqrt{-1}$; $\Omega$ is a frequency in cycles per sample interval; Z is a constant; and d is a delay constant.

In a certain embodiment, a device control system includes a processing module that couples to a device, the processing module configured to receive a first function comprising a user-specified power output of the device over a time duration, and to process the first function into a second function comprising a directive power output of the device over the time duration. The second function has at least one region of equal or increased device power output and at least one region of decreased device power output, relative to the user-specified device power output, such that, if the device outputs power equal to the directive power output of the device over the time duration, the device consumes less energy than the device would have consumed if the device outputted power equal to the user-specified power output of the device over the time duration. The system includes providing the second function to a device control module, such that the device outputs power according to the directive power output of the device over the time duration.

In a certain embodiment, the system includes an information module configured to inform a user of a possibility or achievement of energy saving by the device if the device outputs power according to the directive power output of the device. In a certain embodiment, the system includes an override switch configured to allow a user to select an override of the energy savings. In a certain embodiment, the system includes the aspect that the user-specified power output of the device is based on a cruise-control setting by a user. In a certain embodiment, the system includes the aspect that the second function is processed for smoothness. In a certain embodiment, the system includes a generator that supplements an output of the device. In a certain embodiment, the generator comprises an electrical generator. In a certain embodiment, the generator comprises a motor. In a certain embodiment, the processing the first function into the second function includes application of a transform T, such that $F2(n)=TF1(n)$, where F2 is the second function; F1 is the first function; and n is an ordered index number of an nth discrete sample, where $n \in \{0, 1, 2, \ldots \infty\}$; and wherein T comprises $(ke^{-2\pi i\Omega(n-d)}-Z)$, where k is a constant; e is an exponential; i is the imaginary number $\sqrt{-1}$; $\Omega$ is a frequency in cycles per sample interval; Z is a constant; and d is a delay constant.

In a certain embodiment, a method is provided for conserving energy used by a device. The method includes receiving as an input to a device power module a first function comprising a user-specified power output of a device over a time duration. The method includes using a computer-executable instruction to process the first function into a second function comprising a directive power output of the device over the time duration. The second function has at least one region of equal or increased device power output relative to the user-specified device power output, and the second function also has at least one region of decreased device power output relative to the user-specified device power output, so that, if the device outputs power equal to the directive power output of the device over the time duration, the device consumes less energy than the device would have consumed if the device outputted power equal to the user-specified power output of the device over the time duration. The method includes outputting, to a device control module, the second function, such that the device outputs power according to the directive power output of the device over the time duration.

In a certain embodiment, a device control system includes a processing module that couples to a device, the processing module configured to receive a first function comprising a user-specified power output of the device over a time duration, and uses a computer-executable instruction to process the first function into a second function comprising a directive power output of the device over the time duration. The second function has at least one region of equal or increased device power output and at least one region of decreased device power output, relative to the user-specified device power output, such that, if the device outputs power equal to the directive power output of the device over the time duration, the device consumes less energy than the device would have consumed if the device outputted power equal to the user-specified power output of the device over the time duration. The system includes providing the second function to a device control module, such that the device outputs power according to the directive power output of the device over the time duration.

According to certain embodiments, a method of conserving energy used by a device is provided. The method comprises receiving as an input to an energy controller a first function comprising a first work output of a device over a time period. The method also comprises processing, by a processor, the first function into a second function comprising a second work output of the device over the time period. The second function has at least one region of equal or increased work output relative to the first work output. The second function has at least one region of decreased work output relative to the first work output. In some embodiments, when the device outputs work equal to the second work output over the time period, the device consumes less energy than the device would consume if the device outputted work equal to the first work output over the time period. In some embodiments, the device performs substantially the same amount of work under the second work output over the time period as the device would perform under the first work output over the time period. The method also comprises directing the device to output work according to the second work output over the time period.

According to certain embodiments, the method comprises displaying to a user an indication of a possibility or achievement of energy savings by the device if the device outputs work according to the second work output. In some embodiments, the method comprises supplementing an output of the device with output generated by a generator while the device outputs work according to the second work output. In some embodiments, the method comprises supplementing a work output of the device with work from a second device different from the device while the device outputs work according to the second work output. In some embodiments, the method comprises processing the second function for smoothness.

According to certain embodiments, the device comprises at least one of a display screen, a computer, an electronic device, an appliance, an air conditioning system, a heating system, a pump system, and a light emitter. In some embodiments, the second work output oscillates during the time period.

According to certain embodiments, the processing of the first function into the second function comprises application of a transform T, such that $F_2(n)=TF_1(n)$, where $F_2$ is the second function, $F_1$ is the first function, and n is an ordered index number of an nth discrete sample, where $n \in \{0, 1, 2, \ldots \infty\}$. T comprises $ke^{-2\pi i \Omega(n-d)}-Z$, where k is a scalar, e is an exponential, i is the imaginary number $\sqrt{-1}$, $\Omega$ is a frequency in cycles per sample interval, Z is a scalar, and d is a delay scalar.

According to certain embodiments, the processing of the first function into the second function comprises application of a transform T, such that $F_2(n)=T+F_1(n)$, where $F_2$ is the second function, $F_1$ is the first function, and n is an ordered index number of an nth discrete sample, where $n \in \{0, 1, 2, \ldots \infty\}$. T comprises $$\frac{a_0}{2} + \sum_{j=1}^{\infty} [a_j \cos(j2\pi\Omega n) + b_j \sin(j2\pi\Omega n)],$$

where j is an ordered index number, where $j \in \{1, 2, \ldots \infty\}$; $a_0$ is a real number; $a_j$ is a series of real numbers; $b_j$ is a series of real numbers; and $\Omega$ is a frequency in cycles per sample interval.

In some embodiments, the processing of the first function into the second function comprises application of a transform T, such that $F_2(n)=T+F_1(n)$, where $F_2$ is the second function, $F_1$ is the first function, and n is an ordered index number of an nth discrete sample, where $n \in \{0, 1, 2, \ldots \infty\}$. T comprises $$\begin{cases} q, & \text{when } n = s_1 \\ r, & \text{when } n = s_2 \end{cases},$$

where q is a scalar, r is a scalar different from q, $s_1$ is a first set of samples of n, and $s_2$ is a second set of samples of n different from $s_1$. In some embodiments, the weighted average of $F_2(n)$ over $s_1+s_2$ is approximately equal to the weighted average of $F_1(n)$ over $s_1+s_2$. In some embodiments, members of the first set of samples alternate with members of the second set of samples. In some embodiments, q is greater than or equal to 0 and r is less than 0. In some embodiments, q is greater than 0 and r is less than or equal to 0. In some embodiments, q is greater than 0 and r is less than 0.

According to certain embodiments, a control system comprises a processing module that couples to a device. The processing module is configured to receive a first function comprising a first work output of the device over a time period. The processing module is also configured to process the first function into a second function comprising a second work output of the device over the time period. The second function has at least one region of equal or increased work output and at least one region of decreased work output, relative to the first work output. In some embodiments, when the device outputs work equal to the second work output over the time period, the device consumes less energy than the device would have consumed if the device outputted work equal to the first work output over the time period. In some embodiments, the device performs substantially the same amount of work under the second work output over the time period as the device would perform under the first work output over the time period. The processing module is also configured to output the second function such that the device outputs work according to the second work output over the time period.

In some embodiments, the control system further comprises an information module configured to inform a user of a possibility or achievement of energy savings by the device if the device outputs work according to the second work output. In some embodiments, the control system further comprises an override switch configured to allow a user to select an override of the energy savings. In some embodiments, the control system further comprises a generator that supplements an output of the device.

According to certain embodiments, the second function is processed for smoothness. In some embodiments, the device comprises at least one of a display screen, a computer, an electronic device, an appliance, an air conditioning system, a heating system, a pump system, and a light emitter. In some embodiments, the second work output oscillates during the time period.

According to certain embodiments, the processing of the first function into the second function comprises application of a transform T, such that $F_2(n)=TF_1(n)$, where $F_2$ is the second function, $F_1$ is the first function, and n is an ordered index number of an nth discrete sample, where $n \in \{0, 1, 2, \ldots \infty\}$. T comprises $ke^{-2\pi i \Omega(n-d)}-Z$, where k is a scalar, e is an exponential, i is the imaginary number $\sqrt{-1}$, $\Omega$ is a frequency in cycles per sample interval, Z is a scalar, and d is a delay scalar.

According to certain embodiments, the processing of the first function into the second function comprises application of a transform T, such that $F_2(n)=T+F_1(n)$, where $F_2$ is the second function, $F_1$ is the first function, and n is an ordered index number of an nth discrete sample, where $n \in \{0, 1, 2, \ldots \infty\}$. T comprises $$\frac{a_0}{2} + \sum_{j=1}^{\infty} [a_j \cos(j 2\pi \Omega n) + b_j \sin(j 2\pi \Omega n)],$$

where j is an ordered index number, where j∈{1, 2, ... ∞}; $a_0$ is a real number; $a_j$ is a series of real numbers; $b_j$ is a series of real numbers; and Ω is a frequency in cycles per sample interval.

In some embodiments, the processing of the first function into the second function comprises application of a transform T, such that $F_2(n)=T+F_1(n)$, where $F_2$ is the second function, $F_1$ is the first function, and n is an ordered index number of an nth discrete sample, where n∈{0, 1, 2, ... ∞}. T comprises $$\begin{cases} q, & \text{when } n = s_1 \\ r, & \text{when } n = s_2 \end{cases},$$

where q is a scalar, r is a scalar different from q, $s_1$ is a first set of samples of n, and $s_2$ is a second set of samples of n different from $s_1$. In some embodiments, the weighted average of $F_2(n)$ over $s_1+s_2$ is approximately equal to the weighted average of $F_1(n)$ over $s_1+s_2$. In some embodiments, members of the first set of samples alternate with members of the second set of samples. In some embodiments, q is greater than or equal to 0 and r is less than 0. In some embodiments, q is greater than 0 and r is less than or equal to 0. In some embodiments, q is greater than 0 and r is less than 0.

According to certain embodiments, a control system comprises means for receiving as an input to an energy controller a first function comprising a first work output of a device over a time period. The control system also comprises means for processing the first function into a second function comprising a second work output of the device over the time period. The second function has at least one region of equal or increased work output relative to the first work output. The second function has at least one region of decreased work output relative to the first work output. In some embodiments, when the device outputs work equal to the second work output over the time period, the device consumes less energy than the device would consume if the device outputted work equal to the first work output over the time period. In some embodiments, the device performs substantially the same amount of work under the second work output over the time period as the device would perform under the first work output over the time period. The control system also comprises means for directing the device to output work according to the second work output over the time period.

According to certain embodiments, a method, of conserving energy used by a device, is provided. The method comprises receiving as an input to an energy controller a first function comprising a first work output of a device over a time period. The method also comprises using a computer-executable instruction, processing the first function into a second function comprising a second work output of the device over the time period. The second function has at least one region of equal or increased work output relative to the first work output. The second function has at least one region of decreased work output relative to the first work output. In some embodiments, when the device outputs work equal to the second work output over the time period, the device consumes less energy than the device would have consumed if the device outputted work equal to the first work output over the time period. In some embodiments, the device performs substantially the same amount of work under the second work output over the time period as the device would perform under the first work output over the time period. The method also comprises directing the device to output work according to the second work output over the time period.

In the following description, reference is made to the accompanying attachment that forms a part thereof, and in which are shown by way of illustration specific embodiments in which the inventions may be practiced. It is to be understood that other embodiments may be utilized and changes may be made without departing from the scope of the present inventions.

BRIEF DESCRIPTION OF DRAWINGS

The inventions, both to their organization and manner of operation, may be further understood by reference to the drawings that include FIGS. 1 through 7B taken in connection with the following descriptions.

DETAILED DESCRIPTION OF THE INVENTION

The following description of illustrative non-limiting embodiments discloses specific configurations and components. However, the embodiments are merely examples of the present inventions, and thus, the specific features described below are merely used to describe such embodiments to provide an overall understanding of the inventions. One skilled in the art readily recognizes that the present inventions are not limited to the specific embodiments described below. Furthermore, certain descriptions of various configurations and components of the present inventions that are known to one skilled in the art are omitted for the sake of clarity and brevity. Further, while the term "embodiment" may be used to describe certain aspects of the inventions, the term "embodiment" should not be construed to mean that those aspects discussed apply merely to that embodiment, but that all aspects or some aspects of the disclosed inventions may apply to all embodiments, or some embodiments.

Figure 1A:
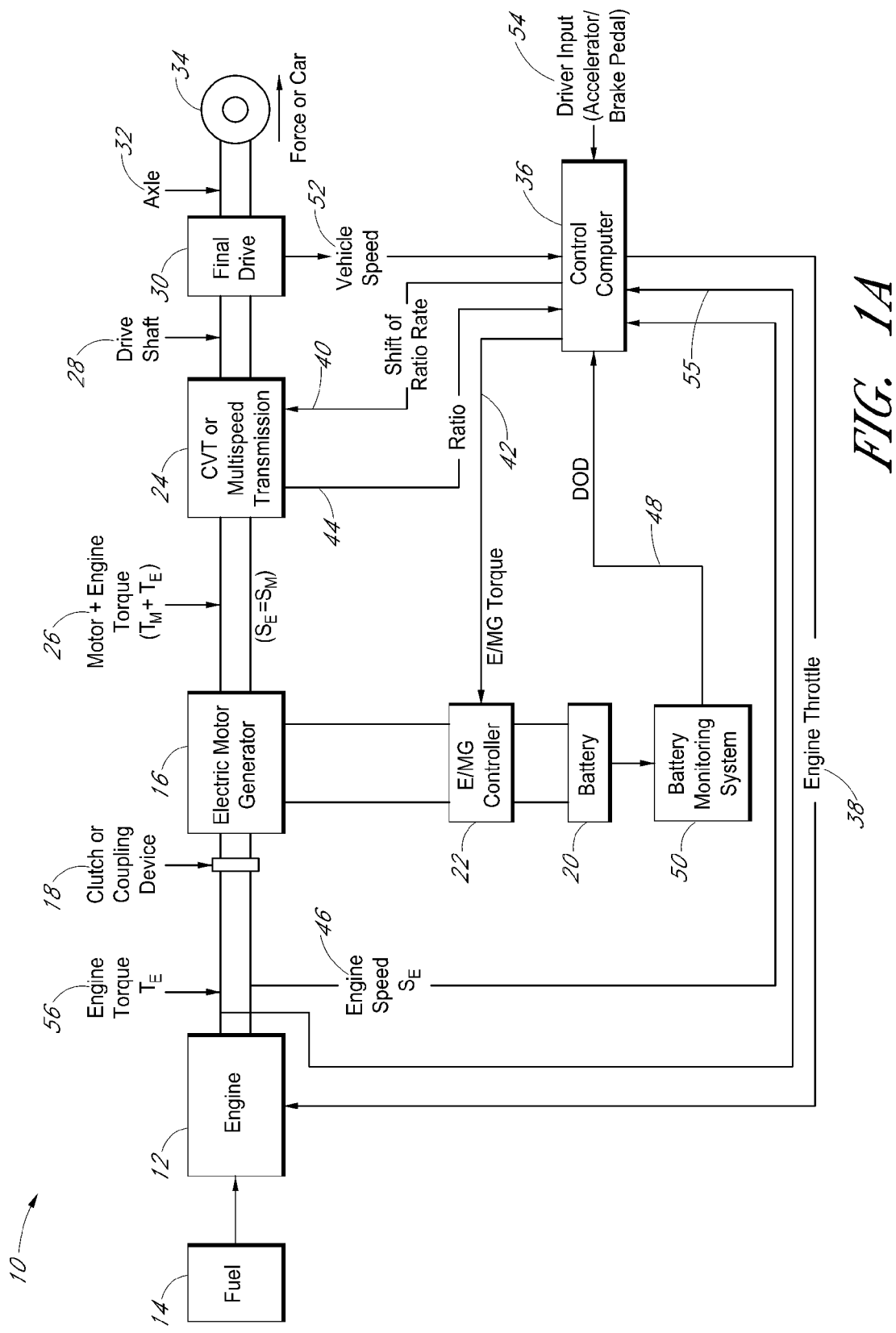
FIG. 1A is a schematic illustration of a certain embodiment.

FIG. 1A is a block diagram of a certain embodiment of the present inventions including energy consuming device system 10. In some embodiments, the energy consuming device system 10 may comprise an internal combustion engine system. In certain embodiments the system 10 may include both a hybrid-electrical portion and a device or an energy consuming device portion. The system 10 is configured for low energy consumption and emissions. As shown in the figure, the energy consuming device 12 is powered by an energy supply 14. In certain embodiments, device 12 may comprise an engine. In certain embodiments, energy supply 14 may comprise a fuel supply. While an electric motor generator (EMG) 16 is shown as coupled to device 12, certain embodiments do not require EMG 16, and in those embodiments device 12 is coupled to CVT or multispeed transmission 24. In certain embodiments, electric motors such as EMG 16 may be coupled into a drive system such as system 10 in different ways. For example, electric motors may be directly coupled to wheels 34 in accordance with certain embodiments.

In certain embodiments, device 12 is coupled to at least one of EMG 16 and CVT/multispeed transmission 24 with either a clutch 18 or other coupling device, such as a torque converter. EMG 16 is powered by battery 20 (that may include a capacitor), and battery energy is controlled with E/MG controller 22. E/MG controller 22 controls the extent of power output torque $T_m$ generated by EMG 16. At certain points along a torque $T_e$ power curve (for instance, one of the power curves shown in FIG. 2 as C1-C1, C2-C2, or C3-C3), E/MG controller 22 controls EMG 16, as instructed by control computer 36 via E/MG torque signal 42, to either produce additional electrical motor torque $T_m$, to reduce a total amount of electrical motor torque $T_m$, or to stop producing electrical motor torque $T_m$.

In certain embodiments, control computer 36 comprises a processing module, and as such may be implemented in either of software means or hardware means. For example, control computer 36 may be a programmable logic controller, a computer comprised of chips and circuits along with firmware and/or software, or an integrated chip containing software instructions for performing the processing described herein. In either example the control computer 36 is in communicative connection with energy consuming device system 10, as one of skill in the art would comprehend and as described herein.

In certain embodiments, EMG 16 may be coupled to a continuously variable transmission (CVT) or multispeed transmission 24 which receives, at its input, at least one of device 12 torque ($T_e$) and electric motor 16 torque ($T_m$) 26. CVT 24 turns a drive shaft 28. Drive shaft 28 is coupled to final drive 30 which turns axle 32 and which is coupled to wheels 34. Thus, at least one of $T_e$ and $T_m$ causes the wheels 34 to turn. Control computer 36 sets control parameters and monitors the overall operation of the system 10, including control of energy 14 to the device 12 via engine throttle control signal 38. While "throttle" typically indicates a carburetor device, one of skill in the art would understand that any controlled input could be used to deliver energy 14 to device 12, such as energy injection, microspray, and/or ultrasonic atomizing. In certain embodiments, energy 14 may be any type of combustible energy including a liquid such as gasoline, gasohol, diesel, bio-energy, or a compressed gas, such as hydrogen, propane, or methane.

Control parameters within control of control computer 36 may include, in addition to engine throttle control signal 38, shift of ratio rate (rate of change ratio) 40 for the CVT or multispeed transmission 24, and E/MG torque parameters 42 for E/MG controller 22. Operational characteristics that may be monitored include ratio 44 of the CVT or multispeed transmission 24, engine speed ($S_e$) 46, depth of discharge (DOD) 48 for the battery, as provided by battery monitoring system 50, vehicle speed 52, and driver input 54 (e.g., accelerator/brake pedal motion). Battery monitoring system 50 may be a computer, or may be controlled by a programmable logic controller (PLC), or other monitoring/control device as may be selected by one of skill in the art.

In certain embodiments, CVT 24 may smooth engine oscillations. For example, when device 12, as an engine, has variations in RPMs that are significant enough to be felt by a driver, CVT 24 may change its shift of ratio rate to compensate. That is, the CVT 24 may change its shift of ratio rate so that the variation in engine RPM speed is either not felt or is felt less by a driver.

In certain embodiments, driver input 54 includes at least a first function that comprises a directive power torque $T_e$ output over a time duration. Driver input 54 need not be provided by a human driver, but nonetheless may be an input such as a depressed acceleration pedal or brake pedal, or it may be an input from a cruise control module, or a pre-determined input, or a patterned input that may be based upon a recent history of the energy consuming device system 10, or an expected usage pattern. The input 54 is provided to control computer 36. Engine torque ($T_e$) 56 is measured at control computer 36 via engine torque feedback loop 55. Engine torque $T_e$ is a function of force applied to a crankshaft of device 12 and as felt at clutch or coupling device 18.

In certain embodiments, control computer 36 is configured to have access to a memory (either internal or external to control computer 36) that includes knowledge of device 12 parameters. Device 12 parameters includes at least knowledge of expected torque $T_e$ for device 12 including knowledge of $T_e$ along a power curve and selected or selectable zones of efficiency within the power curve. Device 12 parameters may include further knowledge, such as cubic inches of chamber space available for ignition of energy 14, type of required or suggested energy 14, shape of the ignition chambers, compression ratios of ignition chambers, friction coefficients, and optimum thermal dynamics.

Figure 1B:
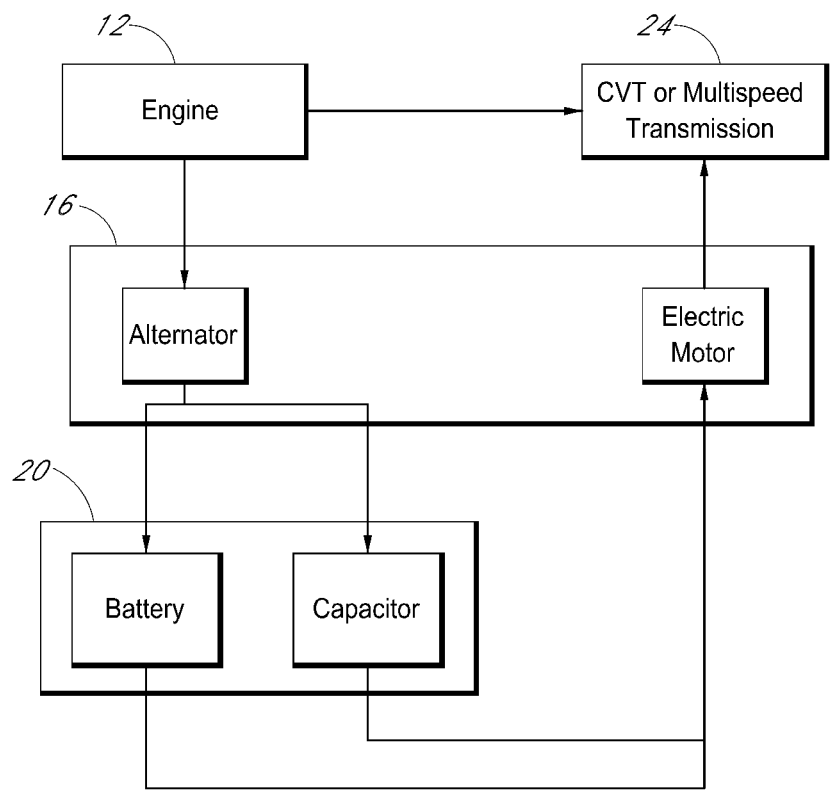
FIG. 1B is a schematic illustration of a certain embodiment.

FIG. 1B illustrates device 12 (e.g., as an engine), EMG 16, battery 20 and CVT/multispeed transmission 24 according to some embodiments. EMG 16 may comprise one or more alternators and one or more electric motors. Battery 20 may comprise one or more batteries and one or more capacitors. The alternator of EMG 16 may convert the mechanical energy produced by device 12 into electrical energy. This electrical energy may charge the battery and/or the capacitor. The capacitor can be useful because the battery may not always be able to charge sufficiently fast enough, especially when a lot of electrical energy (e.g., current) is produced. In such a case, the electrical energy may be lost, thus causing general efficiency to decrease and also causing the loss of energy which could have been applied to supplementing energy from energy consumption. According to certain embodiments, having one or more capacitors may mitigate this problem. The capacitor may charge and discharge very quickly compared to the battery. The charge from the capacitor may be used later to charge the battery or may be used to power an electric motor (e.g., EMG 16) which may supplement the engine's output.

For example, the capacitor may be about one to two Farads. Multiple capacitors may be used. In some embodiments, the battery may be in parallel to the capacitor. In some embodiments, the battery may be in series with the capacitor. The stored electrical energy from battery 20 may be applied to the electric motor.

Figure 2:
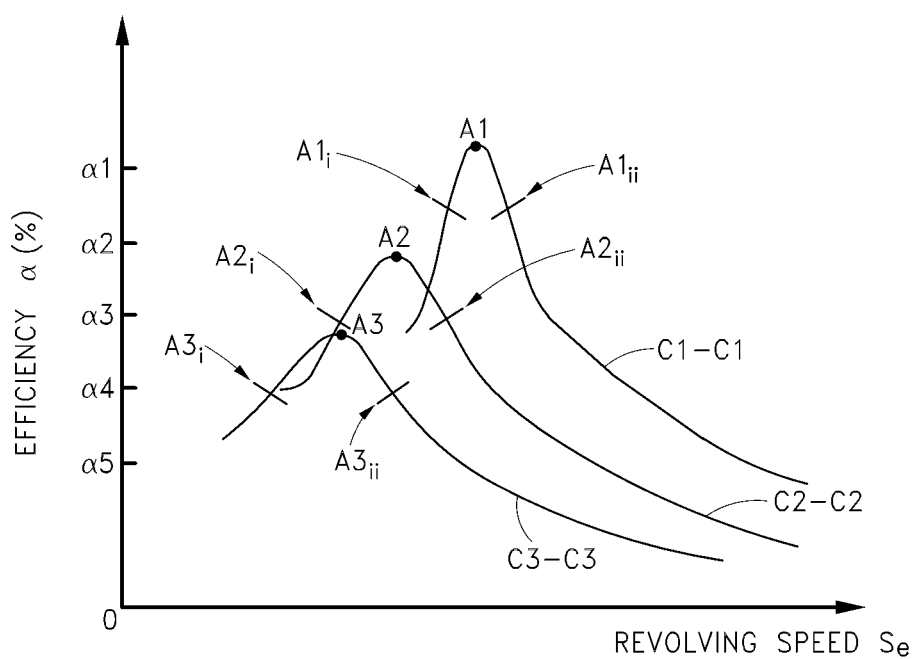
FIG. 2 is a graph that is useful for describing certain embodiments including efficiency against device speed.

FIG. 2 is a graph illustrating maximum efficiency for various devices or energy consuming devices along power curves C1-C1, C2-C2, and C3-C3. Efficiency is shown along the y axis, and speed is shown along the x axis. Each of power curves C1-C1, C2-C2, and C3-C3 are examples of different devices or energy consuming devices and their relative efficiencies in view of torque and revolving speed Se. In some embodiments, each energy consuming device has an initial speed and torque output that begins at zero. Speed $S_e$ increases as a result of the amount of force (Te) applied to a crankshaft. The amount of force ($T_e$) begins at a low point, hits a peak, and then descends across a spectrum of speed. That is, at a speed $S_e$ just above zero and progressing towards a faster revolving engine speed, force $T_e$ initially approaches and then reaches maximum efficiency as shown by points A1, A2, and A3 for respective power curves, C1-C1, C2-C2, and C3-C3. Prior to reaching points A1, A2, and A3, the energy consuming device reaches a zone of efficiency at points $A1_i$, $A2_i$, and $A3_i$, respectively.

A zone of efficiency for many vehicles with devices or energy consuming devices includes a revolving speed Se that equates to a vehicle speed of about 45 to 60 miles per hour. As one of skill in the art would understand, vehicle speed in terms of miles per hour depends upon many factors in addition to torque $T_e$ and revolving speed $S_e$, such as weight of the vehicle and load (if any) in addition to vehicle weight, aerodynamics, transmission ratio, and incline or decline of path traveled.

Individual zones of efficiency $A1_i$-$A1_{ii}$, $A2_i$-$A2_{ii}$, and $A3_i$-$A3_{ii}$ reach a maximum point of efficiency A1, A2, and A3, respectively, and then as revolving speed Se continues to increase, overall efficiency at points $A1_{ii}$, $A2_{ii}$, and $A3_{ii}$, has reached a point of diminishing returns—that is, any increase in energy 14 provided to device 12 past points $A1_{ii}$, $A2_{ii}$, and $A3_{ii}$ results in less and less torque $T_e$ as far as gains in revolutions per minute, or speed $S_e$ is concerned. There may be multiple zones of efficiency for individual power curves, for example, a preferred zone, a secondary zone, and a tertiary zone. For purposes of clarity, FIG. 2 illustrates a preferred zone of efficiency, for example, $A1_i$-$A1_{ii}$, as an aspect of certain embodiments.

According to some embodiments, efficiency may be represented as:

$$\text{Efficiency} = \frac{\text{Output}}{\text{Input}} = \frac{\text{Work}}{\text{Work} + \text{Energy}_{Loss}}$$

Thus, efficiency may be determined in terms of the ratio between the amount of energy going to work and the amount of energy going to work plus any energy that is lost. Energy loss may come from a variety of sources, for example, heat loss and loss of electrical energy because of inefficiencies with battery charging. In certain embodiments, efficiency can be improved by reducing the energy loss relative to a given amount of work performed. In some embodiments, "work" as used herein generally refers to energy expended to perform mechanical work (e.g., kinetic energy) or electrical work, including storing electrostatic potential energy (e.g., in a capacitor) or producing luminescence (e.g., in a light bulb). In this context, this "work" does not substantially include energy dissipated as heat, which is often considered a form of energy loss.

As noted previously, input 54 shown in FIG. 1A includes a user-specified power output as a first function for device 12 over a time duration. By way of example, a user-specified power output may be provided when a user depresses an accelerator pedal or engages a cruise control module. Control computer 36 takes the first function and processes the first function into a second function. The second function comprises a directive power output $T_e$ of device 12 for a time duration and the second function may be delivered to device 12 via engine throttle signal 38. The second function may include both a region of equal or increased power output and a region of decreased power output in relation to the first function. That is, the second function represents a modified version of the first function after having undergone further processing. According to certain embodiments, the power output of the second function may oscillate during the time duration. In some embodiments, the power output of the second function may be periodic during the time duration. Although the first function and/or the second function are described as comprising power outputs, the first function and/or the second function may comprise other types of outputs such as work outputs.

For example, in a certain embodiment, the second function is derived from the first function after having been processed with an algorithm, for instance:

$$P_d = (F_{2reg1} + F_{2reg2}) \approx F_1, \text{ where}$$

$P_d$=directive power output;
$F_{2reg1}$=a region of equal or increased engine power output relative to a user-specified power output $F_1$ ($F_{2reg1} \geq F_1$); and
$F_{2reg2}$=a region of decreased engine power output relative to the user-specified power output $F_1$ ($F_{2reg2} < F_1$).

In a certain embodiment, a driver depresses a gas pedal. The depressed gas pedal provides an input 54 to control computer 36. (Input 54 may be another input, such as a cruise control input.) Control computer 36 is aware of engine speed $S_e$ 46 and also has access to a memory (not shown in FIG. 1A) that is either internal or external to computer 36. The memory includes at least knowledge of expected torque $T_e$ for device 12 including knowledge of $T_e$ along a power curve and selected or selectable zones of efficiency within the power curve. For example, in certain embodiments, the memory includes knowledge of power curve C1-C1 and a preferred zone of efficiency $A1_i$-$A1_{ii}$. Control computer 36 also receives as an input the feedback loop signal 55 for engine torque $T_e$.

With knowledge of the information of the engine's (element 12's) power curve C1-C1, the preferred zone of efficiency $A1_i$-$A1_{ii}$, and with the engine torque $T_e$ signal 56, control computer 36 is configured to process driver input 54, and to produce a second function from driver input 54. The second function includes a region where engine power $T_e$ may be equal or increased when revolving speed $S_e$ is presently less than point $A1_{ii}$ on power curve C1-C1. The second function also includes a region of decreased power where engine revolving speed $S_e$ is presently greater than point $A1_{ii}$ on power curve C1-C1. During a region of equal or increased power, control computer 36 may instruct device 12 using engine throttle signal 38 to provide additional quantities of energy 14 to an internal combustion chamber. During a region of decreased power, control computer 36 may instruct device 12 using engine throttle signal 38 to lessen quantities of energy 14 to an internal combustion chamber.

In certain embodiments, control computer 36 is configured to oscillate energy delivery instructions to device 12 multiple times over a time duration. For example, the control computer 36 may swing back and forth between instructing device 12 to provide additional quantities of energy 14, and instructing device 12 to lessen quantities of energy 14 to an internal combustion chamber. During such energy oscillation, when the engine torque $T_e$ and engine speed $S_e$ is below point $A1_{ii}$, and the driver input (or other signal such as a cruise control input) 54 indicates, for example, a depressed acceleration pedal, the instruction to provide additional quantities of energy 14 will occur over a greater duration during a specified time duration than will the instruction to lessen quantities of energy 14.

In some embodiments, the overall result during such energy oscillation is that less energy is consumed during a time duration than if the engine either had proceeded with a wide-open throttle, or had proceeded with only continuing periods of additional and unrestricted energy consumption. In some embodiments, the overall result during such energy oscillation is that less energy is consumed during a time duration than in a drive system without system 10. In certain embodiments, oscillation of the energy delivery as described above is imperceptible to a driver because the energy quantities can be very finely controlled by the control computer 36, can be smoothed, and can be compensated for by an output from an additional motor, or by varying the ratio on a CVT/multispeed transmission 24. In certain embodiments, oscillation of the energy delivery as described above is imperceptible to a driver because the instruction to lessen, dampen, or cut energy quantities occurs during a short time period, for example, 50 milliseconds, while the instruction to provide additional quantities of energy occurs during a longer time period, for example, 250 milliseconds. In certain embodiments, oscillation of the energy delivery as described above includes a ramp-up period of about 5-7 seconds while the device 12 is coming up to speed, followed by oscillations where the instruction to provide additional quantities of energy occurs during a period of about 1-2 seconds, followed by the instruction to lessen, dampen, or cut energy quantities that occurs during a time period of about 3-4 seconds, in reiterative fashion.

In certain embodiments, the above-noted energy oscillation is stopped during periods of 'hard' acceleration. For example, when a user depresses a gas pedal beyond a certain threshold and/or at a speed that exceeds a certain threshold, the system may in that case cease to apply the second function so that a user may apply as much throttle with as much corresponding torque or power as is needed or desired.

In certain embodiments, when the engine torque $T_e$ and engine speed $S_e$ is above point $A1_{ii}$ and the driver input signal (or other input such as a cruise control signal) 54 indicates a depressed acceleration pedal (or other condition or pattern), the instruction to provide additional quantities of energy 14 will occur over a lesser duration during a specified time duration than the instruction to lessen quantities of energy 14. In some embodiments, the overall result during such energy oscillation is that less energy is consumed during a time duration than if the engine either had proceeded with a wide-open throttle, or had proceeded with only continuing periods of additional and unrestricted energy consumption. In some embodiments, the overall result during such energy oscillation is that less energy is consumed during a time duration than in a drive system without system 10.

In certain embodiments, when the engine torque $T_e$ and engine speed $S_e$ is above point $A1_{ii}$, the energy consuming device system 10 is configured to bring operation of the device 12 back to within the zone of efficiency $A1_i$-$A1_{ii}$. That is, when engine torque $T_e$ and engine speed $S_e$ is above point $A1_{ii}$, and there fails to be a driver input signal (or other input signal such as a cruise control signal) 54 indicating a depressed acceleration pedal (or other condition or pattern indicating a required torque above point $A1_{ii}$), the instruction to provide additional quantities of energy 14 will approximate an energy quantity for mere minimal operation of device 12, and will occur over a lesser duration during a specified time duration than the instruction to lessen quantities of energy 14.

In certain embodiments, EMG 16 is configured to be instructed by control computer 36 via E/MG torque signal 42 to supplement the torque $T_e$ of device 12 with electrical motor torque $T_m$. For example, when torque $T_e$ and Speed $S_e$ for device 12 has reached point $A1_{ii}$ in FIG. 2, and control computer 36 receives driver input 54 (which may be from the driver depressing the gas pedal, from a cruise control unit, or may be derived from a usage history of the energy consuming device system 10) indicating greater speed is desired, control computer is configured to instruct E/MG controller 22 via E/MG torque signal 42 to increase the amount of electrical motor torque $T_m$ such that the device 12 never leaves zone of efficiency $A1_i$-$A1_{ii}$, while still providing a combined electrical motor torque $T_m$ and engine torque $T_e$ that exceeds that of point $A1_{ii}$. In this situation, the EMG 16 and device 12 may be able to contribute to the movement of the vehicle independently.

In certain embodiments, EMG 16 is configured to be instructed by control computer 36 via E/MG torque signal 42 to provide a majority of torque power to CVT or multispeed transmission 24. For example, when torque $T_e$ and speed $S_e$ of device 12 is either below point $A1_i$ or above point $A1_{ii}$ on power curve C1-C1, control computer 36 may instruct E/MG controller 22 through E/MG control signal 42 to have EMG 16 produce some, most, or approximately all of the torque energy felt at CVT/multispeed transmission 24.

Then, once device 12 is operating within zone of efficiency $A1_i$-$A1_{ii}$, control computer 36 may instruct E/MG 22 via E/MG control signal 42 to lessen the amount of $T_m$ torque produced, to cease producing $T_m$ torque, and/or to convert some of $T_e$ torque to electrical charging energy to charge battery 20 (battery 20 may include a capacitor).

In certain embodiments, battery 20 is at least partially configured to be charged from an alternator powered by device 12. In certain embodiments, battery 20 is configured to be charged by electric motor generator 16 converting some or all of torque energy $T_e$ (or engine output in general) to electrical charging energy. For instance, when battery monitoring system 50 notes a need to charge battery 20, depth of discharge (DOD) signal 48 notifies control computer 36. Control computer 36 notes the need to charge battery 20, and during opportune moments (such as when a combined torque output of both $T_e$ and $T_n$, is not necessary) E/MG controller 22 instructs electric motor generator 16 to convert a portion of $T_e$ from device 12 to electrical charging energy. The electrical charging energy is then fed to battery/capacitor 20 for charging. Similarly, a certain embodiment provides for recouping energy created by braking or other deceleration to charge the battery/capacitor 20.

In certain embodiments, control computer 36 is configured to process the first function 54 (that is, the driver input, cruise control input, or other input 54) approximately contemporaneously with reception of the first function at control computer 36. In certain embodiments, control computer 36 is configured to process the first function substantially extemporaneously based on a history of the first function over time. For example, control computer 36 may take an instantaneous (e.g., one second) snapshot of first function/driver input 54. During that instant, the driver of the vehicle being run by energy consuming device system 10 may have just begun accelerating on a freeway on-ramp to enable a merge into on-coming traffic. This may be aided by various sensors in the vehicle such as acceleration or yaw sensors.

Because the snapshot indicates that the driver desires acceleration, control computer 36 may process the first function/driver input signal 54 and then extemporaneously apply the second function (discussed above) derived from the first function (discussed above) for a certain duration of time, for example, for five seconds, based upon the one second reception of the first function. During that five seconds, control computer 36 may control and manipulate the energy consuming device system 10 in the manner discussed in relation to FIGS. 1 and 2, above, to achieve a savings in energy 14.

In certain embodiments, a feedback loop is provided that is configured to provide a display of information of possible energy savings and/or the achievement of energy savings. In certain embodiments, a user is provided with a kill switch (for instance, switch 311 described in relation to FIG. 3) that is configured to withhold the second function from being applied to the device 12, thereby allowing device 12 to reach a wide-open throttle across any engine revolving speed $S_e$. In certain embodiments as described above, a hard acceleration request from a user may also allow device 12 to reach a wide-open throttle by withholding the second function.

Efficiency is examined herein as a function of power. Although power is discussed, other parameters could be used for implementation of the second function to produce a directive power output. The following non-exclusive list provides examples of such parameters: engine power output, torque, horsepower, proportional air-fuel mixture, rate of fuel injection, engine timing, throttle setting, the speed or velocity of a fuel pump, the rate of exhaust, and alterations in the ignition of the fuel, among others.

Those skilled in the art will readily appreciate that the control methods, policies and/or algorithms of certain embodiments may be implemented on any conventional computer system under processor control using conventional programming techniques in any of hardware, software, or firmware. Further, those skilled in the art will readily appreciate that the control methods, policies and/or algorithms of certain embodiments may be implemented on any energy consuming device, including without limitation, any internal combustion engine, jet engine, locomotive engine, motor boat engine, diesel engine, hybrid combustion-electric engine, and the like.

Figure 3:
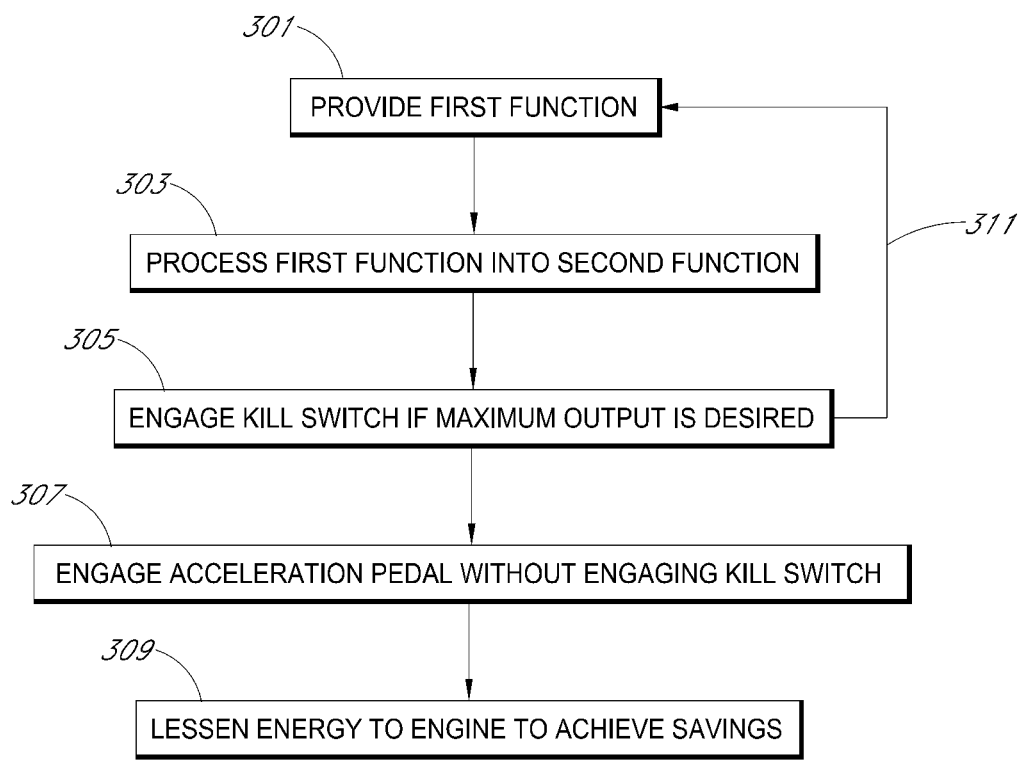
FIG. 3 is a block diagram useful for describing certain embodiments.

FIG. 3 is a block diagram useful for describing certain embodiments, including a method of conserving energy for a device. Block 301 represents providing a first function comprising a user-specified output of a device over a time period to a device power module, for example, the first function as discussed in relation to FIG. 2. Block 303 represents processing (or extrapolating) the first function into a second function comprising a directive power output over a time duration. In certain embodiments, the second function may comprise at least one region of equal or increased engine power output relative to the user-specified engine power output, and also at least one region of decreased engine power output relative to the user-specified engine power output. An example of a second function is that as discussed in relation to FIG. 2. As shown in that figure, the second function may comprise a directive power output $T_e$ of device 12 for a time duration and the second function may be delivered to device 12 via engine throttle signal 38. The second function may include a region of equal or increased power output and a region of decreased power output in relation to the first function. That is, in certain embodiments the second function represents a modified version (or extrapolation) of the first function after having undergone further processing.

Block 305 illustrates the inclusion, in certain embodiments, of a kill switch 311, or a user-provided input 311, that overrides potential energy savings and allows up to a maximum torque such as that provided by a wide-open throttle. In a certain embodiment comprising the features of block 305, a display may provide information regarding present energy savings (or the possibility of energy savings). A user may determine that at that particular moment the engine needs to provide maximum output (e.g., power, torque) and/or speed, and therefore engages switch 311. In certain embodiments, switch 311 may be a threshold on an accelerator pedal, whereupon if the user depresses the pedal past the threshold in terms of either how quick the pedal is depressed and/or how far the pedal is depressed, the switch is engaged. Switch 311 provides an input to a processing module, such as processing module 36 shown in FIG. 1A, and when the user has determined to override any energy savings or potential energy savings, processing module 36 allows the engine to be operated by the user in an unconstrained fashion, that is, to be used for possibly maximum output and/or speed. In other words, the operator is allowed to operate the engine without the directive power output of the second function being applied.

In certain embodiments, the function represented by switch 311 is a 'true' off switch. That is, once the switch 311 is engaged, the operator is allowed to operate the engine without the directive power output of the second function being applied until the operator re-engages the switch 311. In certain embodiments, once the switch 311 is engaged by an operator (and not re-engaged during a course of driving by the operator), the switch is re-engaged by the vehicle automatically upon the device 12 being turned off and then back on. In certain embodiments, when a user-provided input indicates a high demand for vehicle speed (such as by a user 'flooring' a gas pedal), the switch 311 causes a directive engine power output (for instance, that output illustrated by the dashed line in FIG. 5) to cease oscillations above and below the user-specified engine power output (for instance, that output illustrated by the solid line in FIG. 5). In certain embodiments, switch 311 is an engagement switch, i.e., when a user turns the vehicle on, the second function is not automatically implemented but is implemented once a user engages switch 311.

Block 307 represents a certain embodiment, where a user may be provided with energy savings information, and based on that information the user may decide to not engage kill switch 311 while nonetheless engaging an acceleration pedal, thereby informing, for instance, processing module 36 that additional torque output is desired while either maintaining or increasing an energy savings. In such an instance, processing module 36 may instruct an electric torque generator (such as electric motor generator 16 shown in FIG. 1A) to supplement the torque generated by the engine.

Block 309 represents at least a couple of scenarios. First, in a certain embodiment, the processing module 36 may determine that the user is desiring less torque and/or speed, as provided by the first input discussed in relation to FIG. 2. In that instance, processing module 36 may lessen energy to the engine to achieve an energy savings. In another scenario for a certain embodiment represented by block 309, a user may provide an input to processing module 36 by means of a cruise control, or by simply maintaining a present speed for a certain period (such as five seconds), and based on that input the processing module 36 may determine that an electric torque generator (such as electric motor generator 16) may increase its output to maintain a consistent torque or speed as experienced by a user, while still lessening energy to the engine to achieve an energy savings. Finally, in a certain embodiment represented by block 309, the processing module 36 may determine that a user-specified increase, such as a depressed accelerator pedal, falls within a range whereby the electric generator is capable of increasing total torque output while diminishing the torque output of the engine by lessening energy, thereby achieving an energy savings.

Figure 4A:
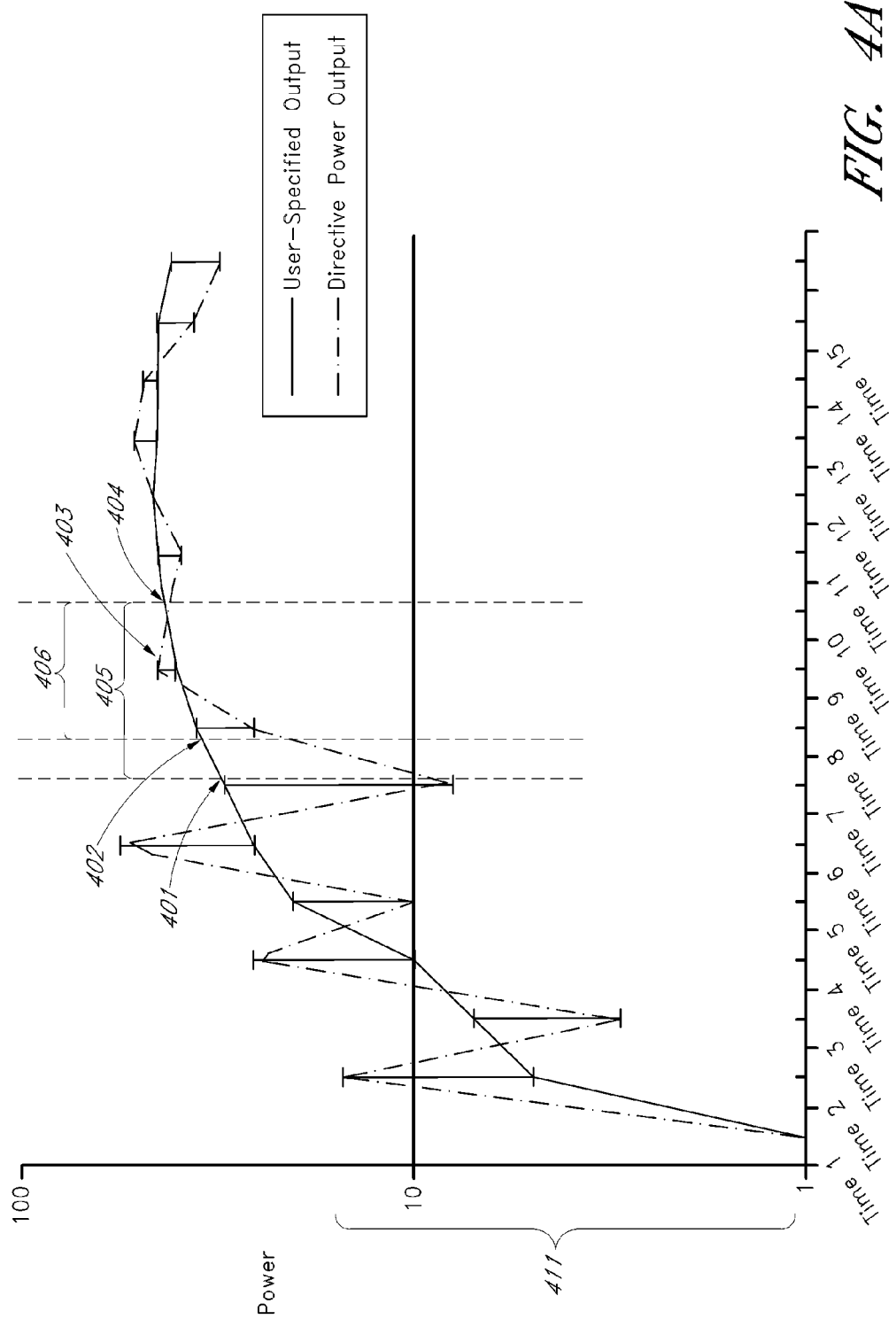
FIG. 4A is a graph that is useful for describing certain embodiments.

FIG. 4A is a graph that illustrates some embodiments including the use of torque/output power/acceleration as a determinant of efficiency in view of a period of acceleration over time. As shown in the figure, prior to point 401 the directive engine power output (shown by the dashed line) oscillates both above and below the user-specified engine power output (shown by the solid line). Between points 401 and 404 lies time frame 405. During time frame 405 the directive power output comprises a region of both increased and decreased engine power output relative to the user-specified engine power output. For example, time frame 406 comprises a directed engine power output that is, substantially, greater than the user-specified engine power output.

Further, the time between points 401 and 402 reflects a region of decreased directive engine power output relative to the user-specified engine power output. Point 403 reflects a peak oscillation of the directive engine power output. Area 411 represents a region where, based on the user accelerating beyond a particular threshold, the system may allow a user to operate the engine without the directive power output of the second function being applied, for instance, in cases of urgency where a user needs a substantially wide-open throttle. In certain embodiments under these circumstances, a user depresses a gas pedal beyond a threshold. By going beyond the threshold (either a physical threshold, such as past a physical point, or a virtual threshold, such as beyond a particular speed), the system allows the operator to use the vehicle without the directive power output of the second function being applied.

Mathematics may be used to describe certain embodiments including the situation where a user is either constantly accelerating a vehicle or maintaining a steady velocity. Consider the user-specified input to be a first function, $F_1$. Further consider that n as an index for the number of a particular discrete sample in an integer series (e.g., 0, 1, 2, . . . n) equals a number, and that T is a transform to apply to the first function to arrive at a second function, $F_2$ that comprises a directive power output. In certain embodiments, $F_2$ may comprise the directive power output illustrated by the solid lines in FIG. 8. In certain embodiments $F_2$ may comprise the directive power output illustrated by the dotted lines in any of FIG. 4A, 4B, 5, 6A, 6B, 7A, or 7B. This may be shown as expressed below.

$$F_2(n)=TF_1(n)$$

Further consider that in some embodiments the transform T comprises $(ke^{-2\pi i\Omega(n-d)}-Z)$, where T may be equal to a scalar k times an exponential function, e, where e is an inverse of a natural log that, along with its exponent, makes the second function oscillate. In some embodiments, k can be a real number scalar (e.g., a one-dimensional vector). For example, k can be a constant. As used herein, "constant," can represent a number that does not change in value or a random variable having a value that can vary according to a probability distribution. Additional variables shown include the imaginary number i, and omega ($\Omega$) as a representation of frequency in cycles per sample interval. The variable d is a scalar. In some embodiments, d can be a real number scalar (e.g., a one-dimensional vector). For example, d can be a constant and is an integer that may include zero (e.g., 0, 1, 2, . . . d). If d is a positive integer, it provides a true time delay. If d is negative, it provides a non-causal product because $F_2(n)$ depends on future samples (e.g., n+1 or n+2). The variable Z is a scalar. In some embodiments, Z can be a real number scalar (e.g., a one-dimensional vector). For example, Z can be a constant that provides an offset for the final directive power output. When Z is positive, the offset moves 'down' with respect to efficiency (or other parameter along the y axis). When Z is negative, the offset moves 'up.' Note that Z could be zero. Note that in some embodiments d is optionally implemented as a delay, and that the offset provided by Z may be used to provide, on average, less power output than the user-specified function, $F_1$. In some embodiments, d=0.

The graph of FIG. 4A may also be explained mathematically for a certain embodiment comprising the situation where a user is constantly accelerating a vehicle. Consider that in some embodiments the first function comprises a straight line segment of slope S representing constant acceleration. In some embodiments, slope S of the user-specified output over time is shown by the solid line in FIG. 4A. This may be expressed as shown below.

$$F_1(n)=Sn$$

In view of some embodiments where a user is constantly accelerating a vehicle as described above, the derived second function may be expressed as provided below.

$$F_2(n)=TSn=(ke^{-2\pi i\Omega(n-d)}-Z)Sn$$

Note that the variable n may equal one or more distinct time periods $t_0 \ldots t_n$ (shown on the graph of FIG. 4A as Time 1 through Time 15). Also note that n is a discrete integer. In certain embodiments the above-featured processing algorithm may be used during any instance of acceleration or deceleration. Furthermore, note that while the y axis of the graph of FIG. 4A (in addition to subsequent graphs as shown in later figures) represents power, the y axis may represent other quantities, such as energy consumption, engine revolutions per minute, or velocity of the vehicle.

Figure 4B:
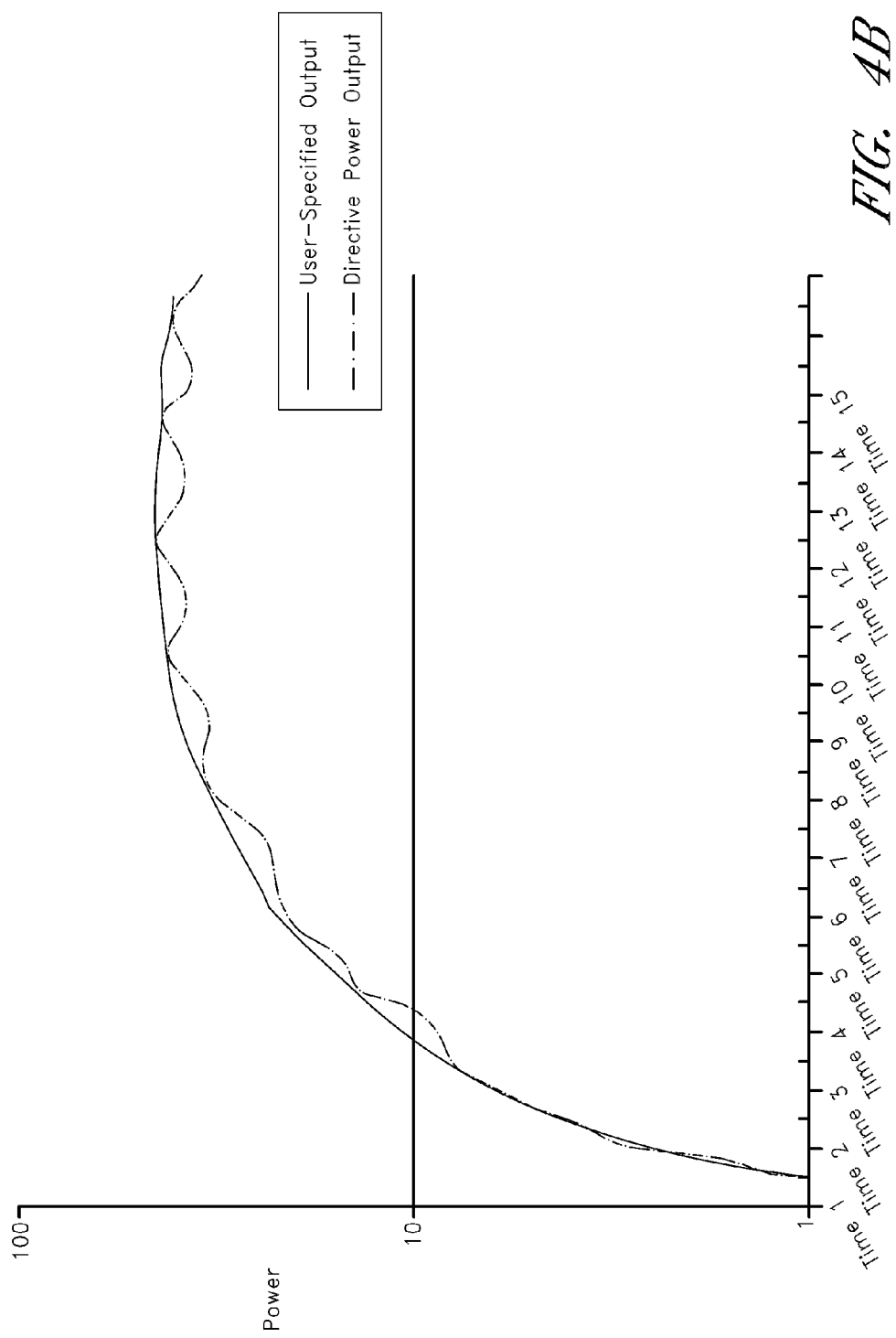
FIG. 4B is a graph that is useful for describing certain embodiments.

FIG. 4B is a graph that illustrates some embodiments similar to FIG. 4A. As shown in FIG. 4B, the directive engine power output (shown by the dashed line) oscillates between being substantially equal to the user-specified function, and being below the user-specified engine power output (shown by the solid line).

The graphs of FIGS. 5, 6A, 6B, 7A, 7B, 8, and/or 9 may be explained mathematically for certain embodiments implementing a cruise control or like device for producing substantially constant velocity (or some other output such as power, energy consumption, engine revolutions per minute, etc.). An algorithm for a cruise control device, as provided below, is similar to that algorithm described above, but comprises a constant C. Constant C represents, for example, a substantially constant input of the user-supplied function $F_1$ shown by the solid lines in FIGS. 5, 6A, 6B, 7A and 7B, or shown by the dotted lines in FIG. 8. In certain embodiments $F_2$ may comprise the directive power output illustrated by the dotted lines in FIGS. 5, 6A, 6B, 7A, and 7B, or illustrated by the solid line in FIG. 8. The first function in this embodiment may be described as shown below.

$$F_1(n)=C$$

In this embodiment, the derived second function may be expressed as shown below.

$$F_2(n)=TC=(ke^{-2\pi i\Omega(n-d)}-Z)C$$

In certain embodiments the above-featured processing algorithms may be used to extrapolate a particular predictive driving behavior. For instance, the transform T may be used to analyze ten discrete and equal time periods of a few hundred milliseconds each. A result of the transform may then be determined by a controller or a processor, and embodiments of the subject technology may then apply the second function, $F_2$, for a certain period of time, for instance, five seconds, with a rolling window of continued application of the second function. That is, the above-noted transform may be repeatedly applied on a rolling basis until a known end event, such as a user applying a brake pedal, applying a switch, pressing the accelerator pedal past a physical threshold or past a speed threshold, or another event.

Figure 5:
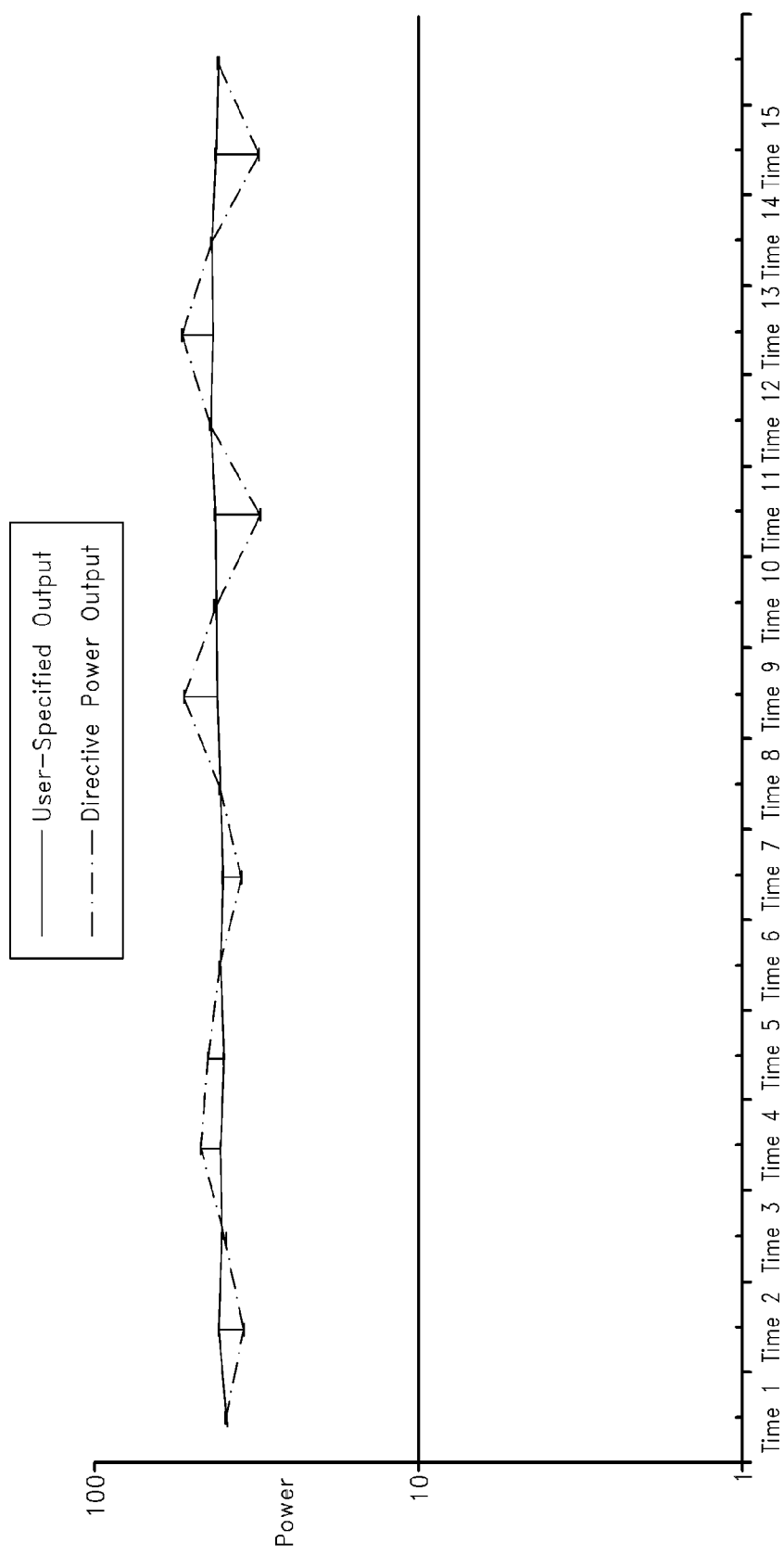
FIG. 5 is a graph that is useful for describing certain embodiments including the application of a directive power output over time in comparison to a user-supplied input.

FIG. 5 is a graph that illustrates some embodiments including the use of torque/output power/acceleration as a determinant of efficiency in view of a substantially steady velocity that is maintained (or anticipated to be maintained), for example, during application of a cruise control input as a first, user-supplied function. As shown in the figure, the directive engine power output (shown by the dashed line) oscillates both above and below the user-specified engine power output (shown by the solid line). At point in time 9, a user has provided a cruise control input that is intended to maintain the speed/velocity of the vehicle. After point 9 the directive power output comprises a region of both increased and decreased engine power output relative to the user-specified engine power output and includes oscillations equal to, above and below the user-supplied function.

The graph of FIG. 5 after point 9 may also be explained mathematically for a certain embodiment as a function of power and time. For instance, assume that at point 9, a directive power function, $F_d$, applies to both power (p) and time (t). The controller 36 (from FIG. 1A, for example) applies the directive power function $F_d$ as a function of both (p) and (t), and extrapolates a projected directive power output over a certain time period. For example, assuming that each time period reflected in FIG. 5 is a discrete moment, for example, 1 second, and that a representative power output is located at each discrete moment in time, then $F_d$(p1, t1)=$F_d$(100 watts, 1 second), and $F_d$(p2, t2)=$F_d$(150 watts, 1 second), etc. . . . through $F_d$ ($p_n$, $t_n$) . . . , then the controller 36 in certain embodiments, extrapolates a future directive power output for a future time period, for example, 4 seconds. For instance, in certain embodiments, the controller 36 has measured the user-provided input as a first function, and based on a continuity of that input for a certain period (for example, 2 seconds) with a steady engine revolving speed and substantially constant velocity (for instance, as provided by a cruise control input), the controller 36 extrapolates that the velocity will be maintained for at least 1 cycle, which in the example shown in FIG. 5 represents 4 seconds, or the time frame from time periods 9 to 13.

The extrapolation shown in FIG. 5, as monitored and controlled by controller 36, continues past point 13 based on the fact that the user-provided input indicates, as viewed from a short, historical perspective (for example, a second) that the engine revolving speed and the vehicle velocity should continue in status quo fashion for a set future length of time. Although watts are described above, one of skill in the art would comprehend that other qualifiers could be used, such as power out divided by power in, or foot/lbs, or another measure of power.

In certain embodiments where the controller 36 receives a first function that comprising a user-specified power output of the device 12 over time, the first function may be a cruise control setting for velocity that is derivable into a power output of the engine over time. Further, either of the first or second functions discussed above may be derived from either of a series of data points over time, or a single data point over time. If the function is derived from a single data point over time, it may be a constant data point, or it may be a data point that changes over time, for example, a cruise control may provide a single data point that remains constant or changes over time, or it may provide multiple data points that remain constant or change over time. The vehicle may experience varying loads due to variations in terrain or wind.

Figure 6A:
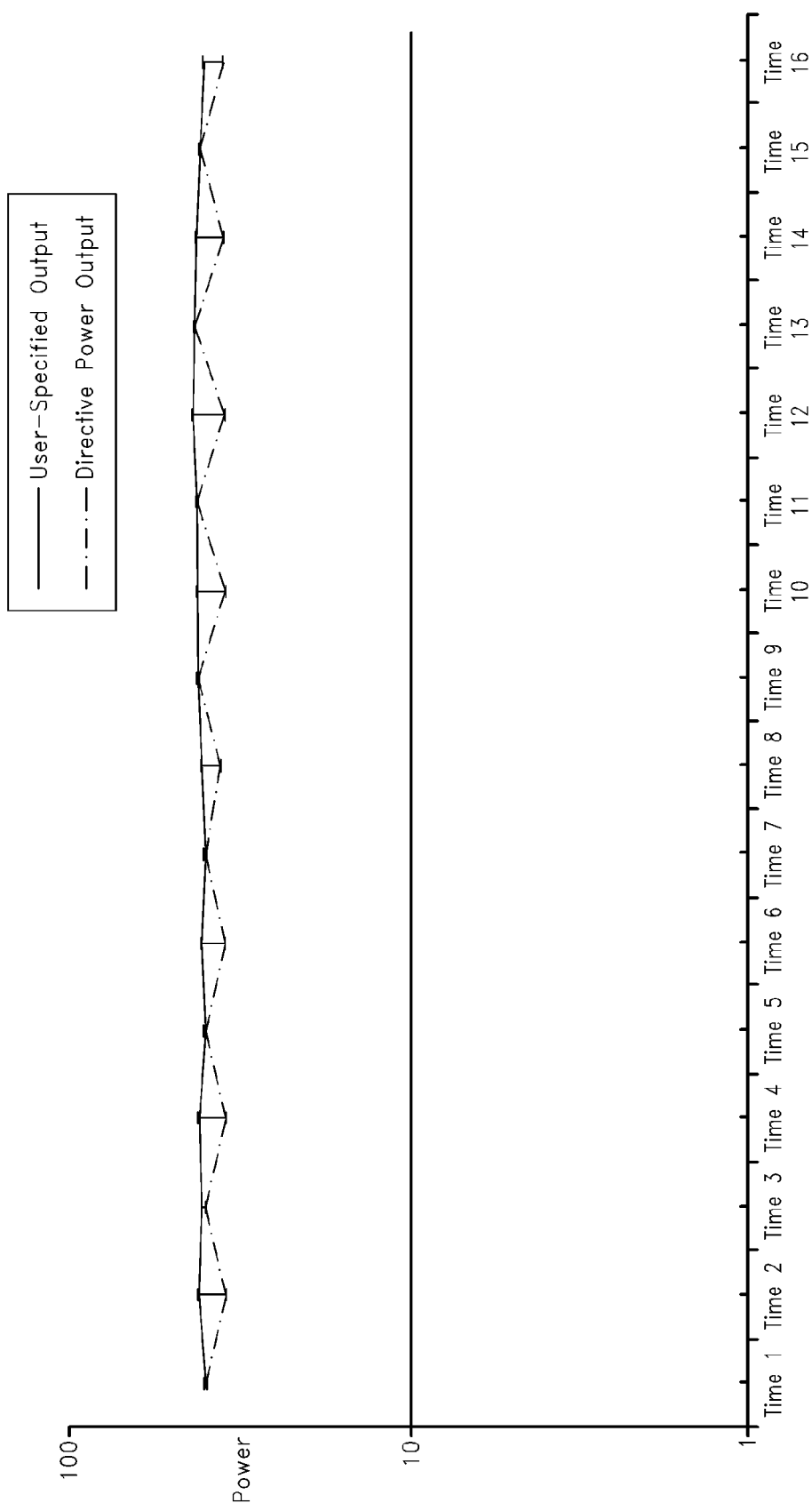
FIG. 6A is a graph that is useful for describing certain embodiments including application of a directive power output over time in comparison to a user-supplied input.

FIG. 6A is a graph that illustrates some embodiments including the use of torque/output power/acceleration as a determinant of efficiency in view of a substantially steady velocity that is maintained (or anticipated to be maintained), for example, during application of a cruise control input as a first, user-supplied function. As shown in the figure, the directive engine power output (shown by the dashed line) oscillates between being substantially equal to the user-specified function, and being below the user-specified engine power output (shown by the solid line). FIG. 6A also reflects certain embodiments where the directive power output has been smoothed, for instance with a binomial, Savitzky-Golay, moving, or other averaging process or algorithm that may make it difficult or even impossible for a user to detect that the directive power output is oscillating. An example using the moving average would simply replace each data value along the time line of the directive engine power output with the average of neighboring values. To avoid an unintended shift in the data, the neighboring values should be averaged using the same methodology.

Figure 6B:
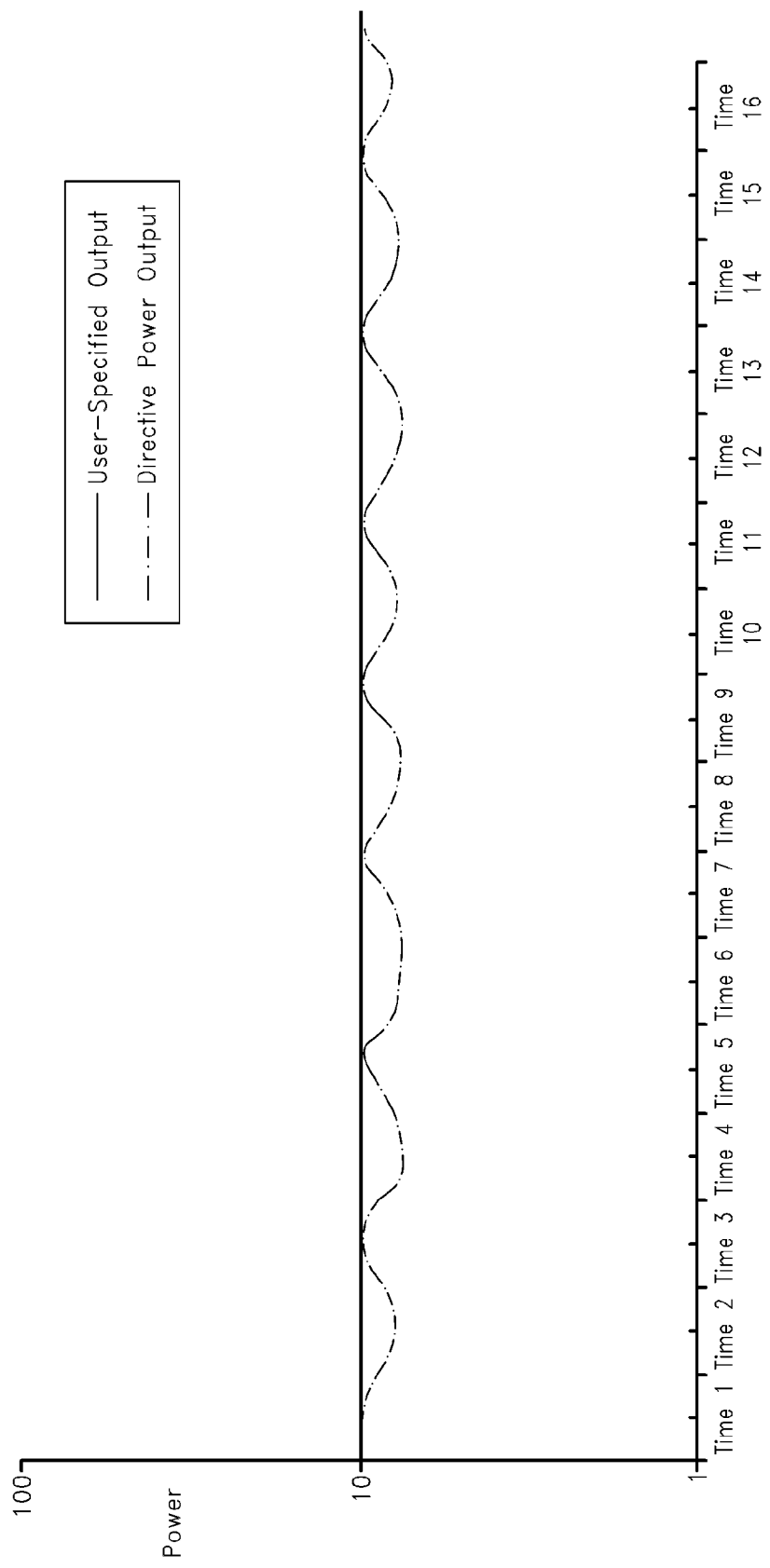
FIG. 6B is a graph that is useful for describing certain embodiments including application of a directive power output over time in comparison to a user-supplied input.

FIG. 6B is a graph that illustrates some embodiments similar to FIG. 6A. As shown in FIG. 6B, the constant C of the user-supplied function $F_1$ is lower than the constant C as illustrated in FIG. 6A. In certain embodiments, the momentum of a vehicle may be capitalized to maintain the vehicle at a desired velocity without having to utilize additional energy. This may be referred to as coasting. For example, the valleys of the directive engine power output may represent instances when the vehicle is coasting to save on energy consumption and yet, maintain a steady velocity (e.g., from cruise control). Less energy may be consumed because more time may be spent in a zone of efficiency for the engine. Furthermore, coasting may result in a reduced power input, which may translate into a decreased heat output of the engine resulting in a more efficient engine (e.g., less energy in the form of heat is lost). In such a case, air conditioning and other cooling requirements may be decreased or relaxed and may increase driver comfort. In certain embodiments, electrical energy from the electric motor may be applied to keep the vehicle at a desired velocity when the vehicle is consuming reduced energy (e.g., during a valley of the directive engine power output).

Figure 7A:
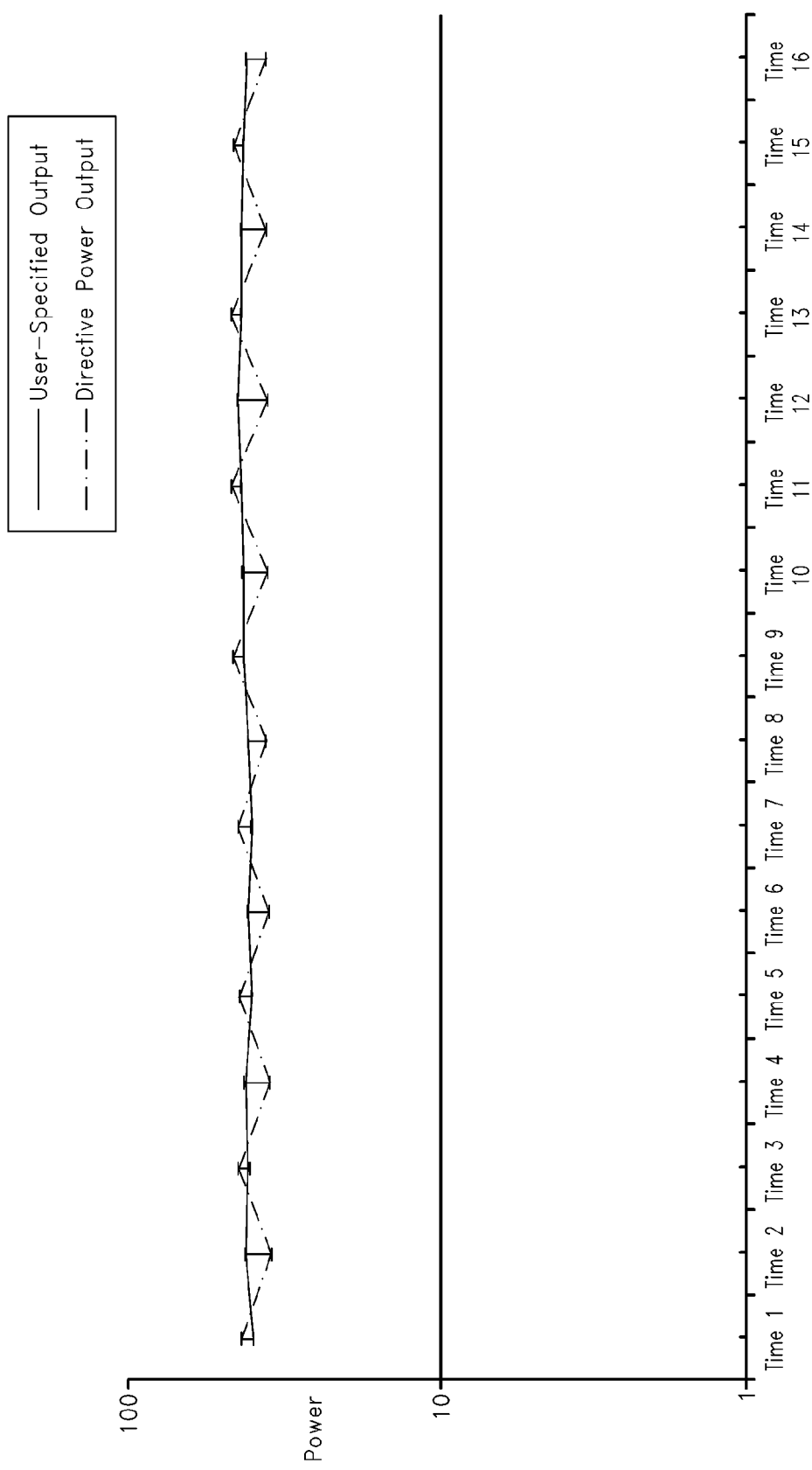
FIG. 7A is a graph that is useful for describing certain embodiments including application of a directive power output over time in comparison to a user-supplied input.
Figure 7B:
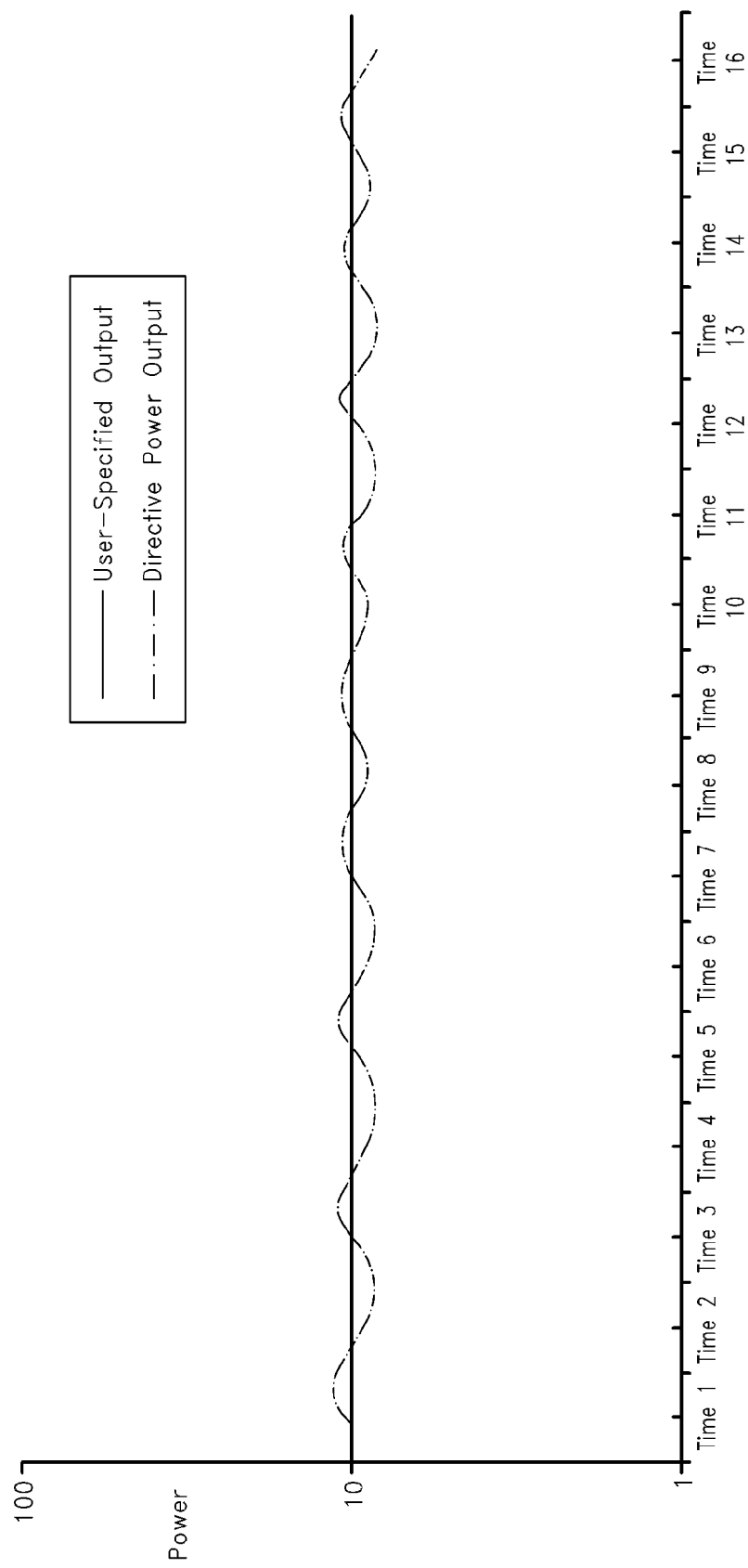
FIG. 7B is a graph that is useful for describing certain embodiments including application of a directive power output over time in comparison to a user-supplied input.

FIG. 7A is a graph that illustrates certain embodiments where the directive power output has been smoothed, for instance as described in relation to FIG. 6A, but wherein the directive power output is instructed to oscillate between slightly above the user-specified function to below the user-specified function. FIG. 7B is a graph that illustrates some embodiments similar to FIG. 7A. As shown in FIG. 7B, the constant C of the user-supplied function $F_1$ is lower than the constant C as illustrated in FIG. 7A. For example, FIG. 7B may illustrate an example where the vehicle may be traveling at a desired steady velocity. In some embodiments, the engine speed may be operating below a zone of efficiency. The directive engine power output may be controlled such that the engine speed can be increased above what would be needed to achieve the desired velocity (e.g., during a peak of the directive engine power output) to reach the zone of efficiency. Then the excess energy generated can be stored in and/or used to charge battery 20 (including the capacitor). When the directive engine power output is modulated such that the power output is decreased (e.g., during a valley of the directive engine power output), electrical energy from the battery 20 may be used (e.g., through the electric motor) to maintain the desired velocity of the vehicle. The changes in engine speed may be perceptible to a user. According to certain embodiments, electrical energy may be used to dampen or balance the modulation of the directive engine power output such that the modulation is not as perceptible to a user via supplemental output from an electric motor. In certain embodiments, the modulation of the directive engine power output may represent a repetition of acceleration followed by coasting to maintain the desired steady velocity. In some embodiments, electrical energy from an electric motor may not be needed to achieve the desired velocity.

In some embodiments, the subject technology may be applicable to a vehicle traveling at low velocities (e.g., city driving speeds below about 35 miles per hour). In some embodiments, the subject technology may be applicable to a vehicle traveling at high velocities (e.g., highway driving speeds above about 35 miles per hour). In some embodiments, other energy (e.g., electrical energy from an electric motor) may be used to supplement energy at either low or high velocities.

In certain embodiments, with respect to references to power and torque as used herein, power may be used instead of torque and vice versa. Those of skill in the art would understand that motors and/or engines may generate both torque and power as outputs. Thus, the reference to output, as used herein, may comprise torque and/or power. According to certain embodiments, the subject technology may be practiced with torque as an output, work as an output, or power as an output, without departing from the scope of the present invention. In some embodiments, torque may refer to the force used to rotate an object (e.g., tendency of force to rotate an object about an axis, fulcrum, or pivot). In some embodiments, power may refer to the work per unit time (e.g., rate at which work is performed, energy is transmitted, or the amount of energy needed or expended for a given unit of time).

In certain embodiments, the energy consuming devices referred to herein can include, without limitation, computer screens (e.g., cathode ray tube (CRT), liquid crystal display (LCD), plasma, or the like), televisions (e.g., high-definition televisions, CRT, LCD, plasma, or the like), personal computers, fans, phones, music players, cameras, clothes dryers, dishwashers, washing machines, electric ranges, home entertainment systems, lights, vacuum cleaners, lawn mowers, refrigerators, microwaves, pool filtration systems, heating systems (e.g., heating elements, blowers, and the like), air conditioning systems (e.g., compressors, blowers, and the like), water heating systems, water well pumps or other pumps, and other appliances. For the foregoing energy consuming devices, the energy conservation systems may or may not include one or more features disclosed above for the energy conservation systems used in connection with engines. For example, an energy conservation system for a clothes dryer may not need to include an accelerator pedal used to receive variable user input.

In certain embodiments, the energy consuming device may comprise devices that emit light, which may include without limitation devices that emit incandescent light and/or fluorescent light, and/or light emitting diodes (LED). In some embodiments, an energy conservation system is provided that can be configured to deliver energy to a light for a period of time, and then dampen and/or cut energy delivery for a period of time. For example, the energy can be delivered to the light and then dampen and/or cut the energy at about 50 times a second. In some embodiments, this cycle can be about 60 times a second, about 70 times a second, about 80 times a second, about 90 times a second, about 100 times a second, or about 110 times a second. In general, this may cause the light to flash on and off. Generally, people can see lights flashing on and off of up to about fifty flashes per second (50 Hertz (Hz)), and in particular, people may be most sensitive to time-varying illumination in the 10-25 Hz range. The actual critical flicker frequency can increase as the light intensity increases up to a maximum value, after which it starts to decrease. When energy is delivered and then dampened and/or cut to the light at a frequency of greater than or equal to about 50 Hz, people generally can no longer distinguish between the individual flashes of light. At this frequency or other similar frequency (e.g., about 45 Hz, 55 Hz, 60 Hz, or 65 Hz), a pulsed fusion threshold can be achieved where the flashes appear to fuse into a steady, continuous source of light while reducing the amount of energy consumed by the light. This energy conservation system can be applied to general household or office lights as well as backlight systems in LCD monitors or televisions, or in discrete light source systems for plasma displays or televisions. In certain embodiments, the energy conservation system for a light can be configured to deliver and then dampen and/or cut energy in a continuous cycle. In certain embodiments, the energy conservation system for a light can be configured to receive user input or input from some other source (e.g., power company, energy management entity, or the like) to adjust the cycle of energy delivery followed by energy dampening and/or cutting, thereby controlling the amount of energy used and/or conserved.

In certain embodiments, the energy consuming device can be a clothes dryer, dishwasher, washing machine, vacuum cleaner, refrigerator, microwave, pool filtration system, heating system (e.g., heating elements, blowers, and the like), air conditioning system (e.g., compressors, blowers, and the like), water well pump or other pump. For example, the energy conservation system can be configured to deliver energy to a clothes dryer for a period of time, and then dampen and/or cut energy delivery for a period of time (e.g., at about ten times a second). In some embodiments, this cycle can be between about 1 Hz and 120 Hz. Specifically, the energy conservation system can deliver gas and then dampen and/or cut delivery of gas used for generating heated air in order to dry clothes. In certain embodiments, an energy conservation system can also be configured to deliver electricity and then dampen and/or cut delivery of electricity used for spinning the clothes in a dryer and/or generating heated air. When electricity is dampened and/or cut to the motor used for spinning the clothes, the momentum in the spinning mechanism may cause the clothes to continue spinning even though the delivery of electricity to the motor has been dampened and/or cut for a period. When gas or electricity is dampened and/or cut to the heating element used for generating heated air, the residual heat in the dryer may continue to dry the clothes. Using this methodology, a pulsed efficiency threshold can be achieved where the clothes continue to spin and/or dry (e.g., due to momentum and/or residual heat) while reducing the amount of energy consumed by the dryer. The foregoing can also be true for other energy consuming devices, including but not limited to dishwashers, washing machines, vacuum cleaners, refrigerators, microwaves, pool filtration systems, heating systems (e.g., heating elements, blowers, and the like), air conditioning systems (e.g., compressors, blowers, and the like), water well pumps or other pumps.

Figure 8:
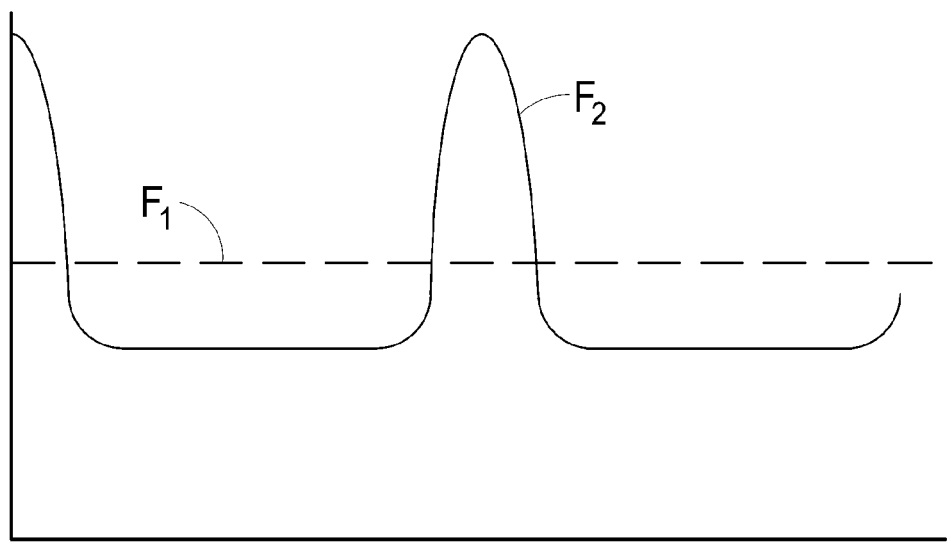
FIG. 8 is a graph that is useful for illustrating examples of a first function and a second function.

FIG. 8 is a graph that describes further examples of the first function $F_1(n)$ and the second function $F_2(n)$, in accordance with various embodiments of the subject technology. In this graph, the first function $F_1(n)$ is illustrated as dotted lines and the second function $F_2(n)$ is illustrated as a solid line. According to certain embodiments, processing the first function into the second function comprises application of a transform T, such that $F_2(n)=TF_1(n)$, where T comprises $ke^{-2\pi i \Omega(n-d)} - Z$, as described above. In some embodiments, processing the first function into the second function comprises application of a transform T, such that $F_2(n)=T+F_1(n)$, where T is of a the form of a discrete Fourier series, comprising:

$$\frac{a_0}{2} + \sum_{j=1}^{\infty} [a_j \cos(j 2\pi \Omega n) + b_j \sin(j 2\pi \Omega n)]$$

In some embodiments, j is an ordered index number, where $j \in \{1, 2, \ldots \infty\}$. In some embodiments, $a_0$ is a real number. In some embodiments, $a_j$ is a series of real numbers. Each $a_j$ can be a real number scalar (e.g., a one-dimensional vector). For example, each $a_j$ can be a constant. In some embodiments, $b_j$ is a series of real numbers. Each $b_j$ can be a real number scalar (e.g., a one-dimensional vector). For example, each $b_j$ can be a constant. $\Omega$ is a frequency in cycles per sample interval. According to certain embodiments, by applying the transform T, the shape of the second function $F_2(n)$ as shown in FIG. 8 can be achieved. In some embodiments, the second function $F_2(n)$ may comprise narrow peaks and gradually formed valleys. However, other suitable shapes of the second function $F_2(n)$ can be achieved using the transform T.

Figure 9:
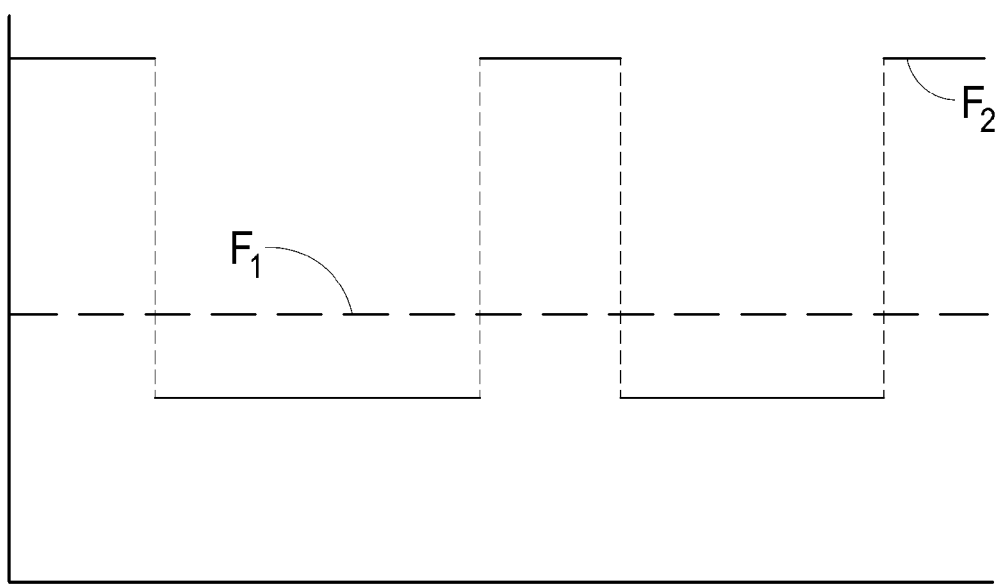
FIG. 9 is a graph that is useful for illustrating examples of a first function and a second function.

FIG. 9 is a graph that describes further examples of the first function $F_1(n)$ and the second function $F_2(n)$, in accordance with various embodiments of the subject technology. In this graph, the first function $F_1(n)$ is illustrated as dotted lines and the second function $F_2(n)$ is illustrated as a solid line. According to certain embodiments, processing the first function into the second function comprises application of a transform T, such that $F_2(n)=T+F_1(n)$, where T comprises:

$$\begin{cases} q, & \text{when } n = s_1 \\ r, & \text{when } n = s_2 \end{cases}$$

In some embodiments, q is a scalar. q can be a real number scalar (e.g., a one-dimensional vector). For example, q can be a constant. In some embodiments, r is a scalar different from q. r can be a real number scalar (e.g., a one-dimensional vector). For example, r can be a constant. In some embodiments, $s_1$ is a first set of samples of n and $s_2$ is a second set of samples of n different from $s_1$. In some embodiments, members of the first set of samples alternate with members of the second set of samples. According to certain embodiments, the weighted average of $F_2(n)$ over $s_1+s_2$ is approximately equal to the weighted average of $F_1(n)$ over $s_1+s_2$. In some embodiments, q is greater than or equal to 0 and r is less than 0. In some embodiments, q is greater than 0 and r is less than or equal to 0. In some embodiments, q is greater than 0 and r is less than 0.

According to certain embodiments, by applying the transform T, the shape of the second function $F_2(n)$ as shown in FIG. 9 can be achieved. In some embodiments, the second function $F_1(n)$ may form a square wave having values greater than $F_1(n)$ and/or values less than $F_1(n)$. However, other suitable shapes of the second function $F_2(n)$ can be achieved using the transform T.

According to various embodiments of the subject technology, an automated system is provided for converting a device's demand for energy into a pulsed signal. For example, the automated system may be a pulsed cruise system that may convert a driver's continuous demand for engine power into a pulsed signal to the engine. Manual hypermiling may serve as an informal validation of the pulsed cruise system. In some embodiments, the pulsed cruise system is not a driver training aid and does not require substantial vehicle integration unlike conventional driver assistance systems. In some embodiments, the pulsed cruise system comprises an active fuel savings device that can dynamically control the consumption of fuel without user intervention. The pulsed cruise system is practical and safe compared to traditional hypermiling. In some embodiments, the pulsed cruise system may comprise systematic modulation of the throttle for fuel savings, with the benefit of essentially imperceptible speed variation. In some embodiments, the pulsed cruise system may comprise automated micro-hypermiling.

According to certain embodiments, a test setup was implemented to generate validation data for the pulsed cruise system. For the test setup, experimental equipment was used. The experimental equipment comprised a General Motors Ecotec Engine (2010 LE5 2.4 liter) configured to simulate a Chevy HHR. The experimental equipment also comprised an engine dynamometer in torque mode, which simulated road load torque and measured the performance of power and torque in addition to fuel economy (e.g., from brake specific fuel consumption).

Figure 10:
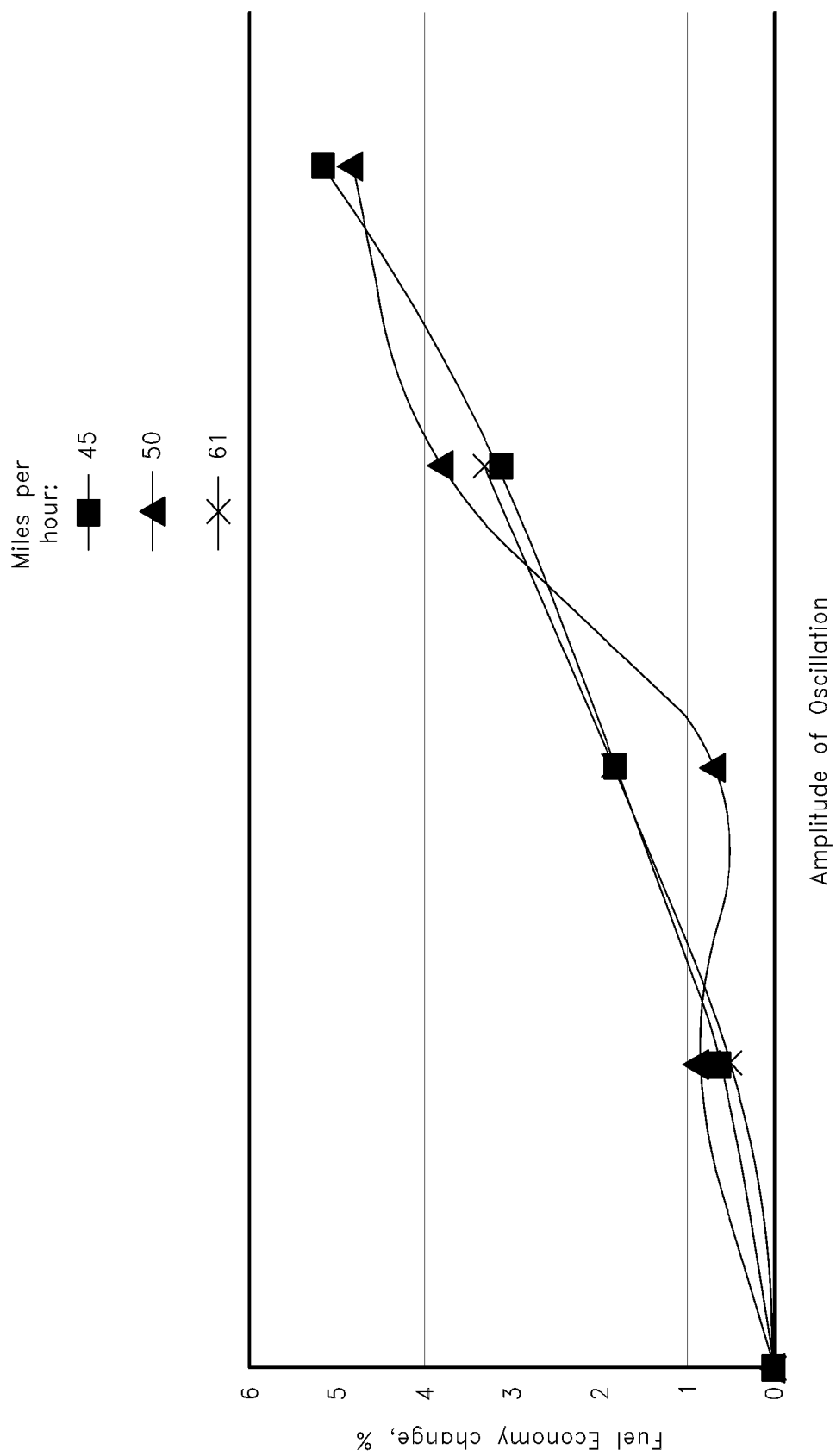
FIG. 10 illustrates validation data results from a test setup.
Figure 11:
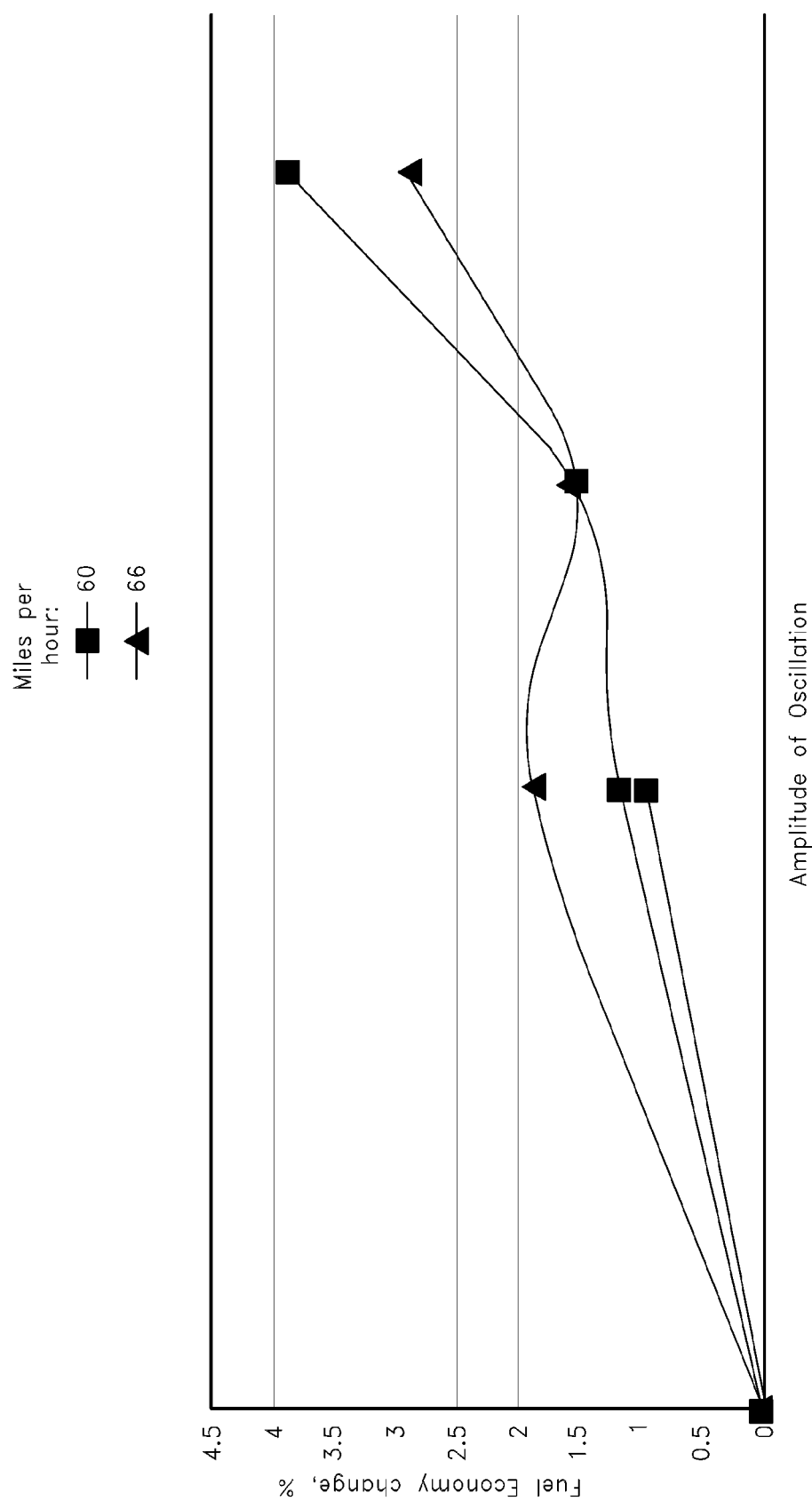
FIG. 11 illustrates validation data results from a test setup.

FIG. 10 illustrates validation data results from the test setup, in accordance with various embodiments of the subject technology. In particular, FIG. 10 is a graph that illustrates pulsed cruise fuel efficiency improvements in fourth gear. In the test setup, the pulsed cruise system increased fuel economy by up to five percent. However, the test setup may be optimized to achieve an even greater amount of savings in fuel. In this particular test setup, the best fuel economy gains were achieved in the fourth gear, as shown in FIG. 10. According to certain embodiments, it can be seen from FIG. 10 that the larger the amplitude of oscillation, the better the improvement in efficiency. FIG. 11 illustrates validation data results from the test setup, in accordance with various embodiments of the subject technology. In particular, FIG. 11 is a graph that illustrates pulsed cruise fuel efficiency improvements in the fifth gear. In the test setup, the pulsed cruise system increased fuel economy by up to four percent in the fifth gear, as shown in FIG. 11.

According to various aspects of the subject technology, the pulsed cruise system may increase fuel economy by periodically operating the engine in a more efficient state and storing kinetic energy from that state. The system may then subsequently release the stored kinetic energy while the engine is operating less efficiently, thereby relieving the engine workload and consequently increasing fuel economy. Using a similar concept, energy savings may be achieved with other devices as noted herein (e.g., display screens, computers, electronics, appliances, air conditioning systems, heating systems, pump systems, light emitters, etc.).

Figure 12:
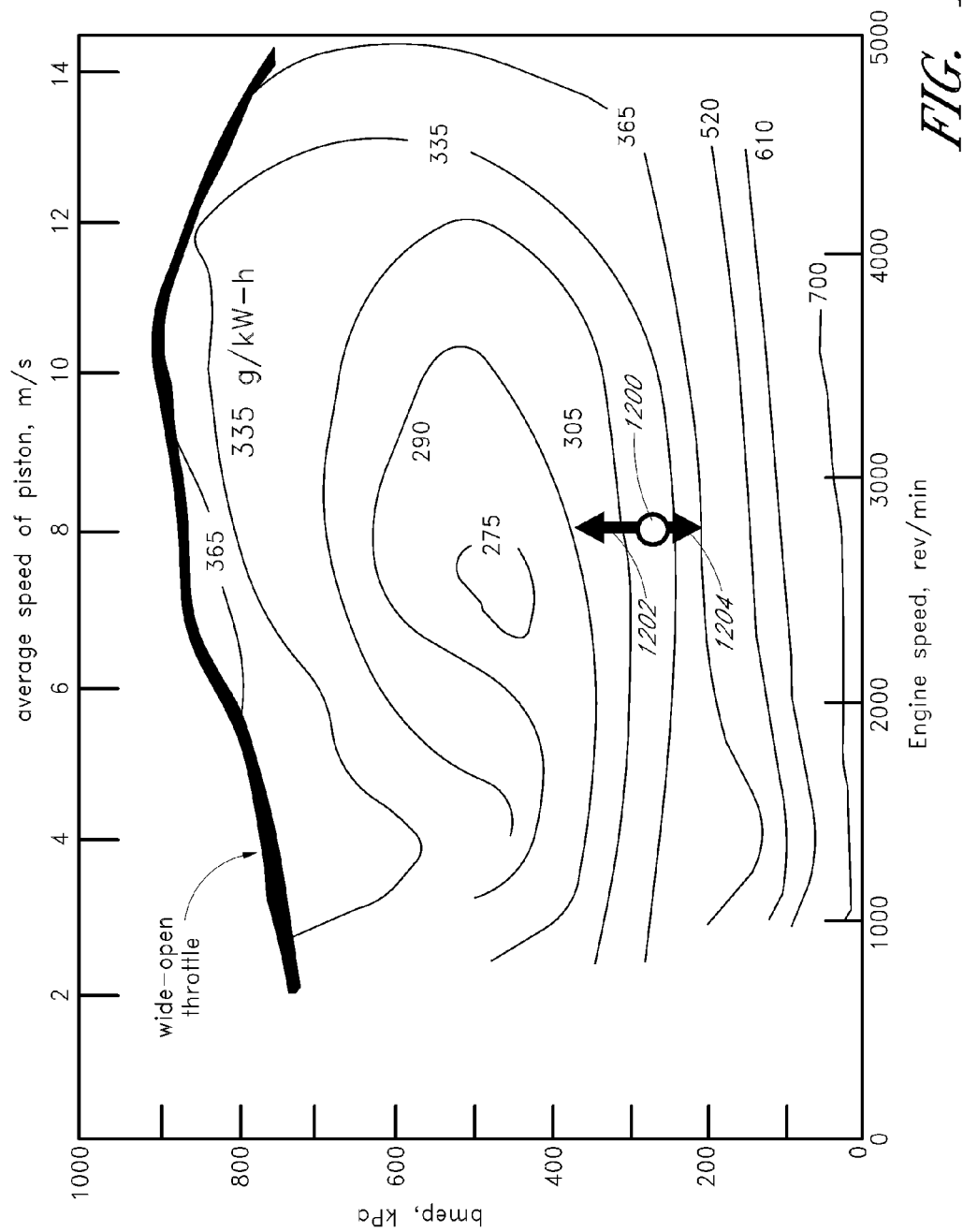
FIG. 12 is a graph illustrating the performance of a simulated engine.

FIG. 12 is a graph illustrating the performance of a simulated engine, in accordance with various embodiments of the subject technology. In particular, FIG. 12 illustrates the engine's brake mean effective pressure (BMEP) relative to the engine speed and relative to the average speed of one or more pistons of the engine. For example, point 1200 represents a vehicle having the simulated engine, with the vehicle traveling in fifth gear at 2800 revolutions per minute (rpm) for the engine speed. In some embodiments, arrow 1202 represents the pulsed cruise system briefly increasing the engine's BMEP. In some embodiments, arrow 1204 represents the pulsed cruise system briefly releasing the throttle. In the area of arrow 1204, the engine is providing only a portion of the load, with the remainder provided by the stored kinetic energy generated by the brief increase in BMEP, as represented by arrow 1202.

According to various embodiments of the subject technology, an example of an implementation of the pulsed cruise system is presented below:

$$\text{Displacement}_{Engine} := 2.4 \cdot l$$

$$N_{engine} := 2500 \cdot rpm$$

$$BMEP_{WOT} := 870 \cdot kPa$$

$$z := 2 \cdot rev$$

$$\text{Power}_{Brake}(bmep) := \frac{\text{Displacement}_{Engine} \cdot N_{engine} \cdot bmep}{z}$$

$$time_{SS} := 4 \cdot sec$$

$$time_{Dip} := time_{SS} - time_{Blip}$$

$$time_{Blip} := 1.25 \cdot sec$$

$$time_{Dip} = 2.75 \ s$$

$$BMEP_{Blip} := 150 \cdot kPa$$

$$BMEP_{Dip} := 75 \cdot kPa$$

$$BMEP_{SS} := 100 \cdot kPa$$

$$\frac{BMEP_{Blip}}{BMEP_{WOT}} = 0.172$$

$$\frac{BMEP_{Dip}}{BMEP_{WOT}} = 0.086$$

$$\frac{BMEP_{SS}}{BMEP_{WOT}} = 0.115$$

$$BP_{Blip} := \text{Power}_{Brake}(BMEP_{Blip})$$

$$BP_{Blip} = 7.5 \cdot kW$$

$$BP_{Dip} := \text{Power}_{Brake}(BMEP_{Dip})$$

$$BP_{Dip} = 3.75 \cdot kW$$

$$BP_{SS} := \text{Power}_{Brake}(BMEP_{SS})$$

$$BP_{SS} = 5 \cdot kW$$

$$BSFC_{Blip} := 520 \cdot \frac{gm}{kW \cdot hr}$$

$$BSFC_{Dip} := 615 \cdot \frac{gm}{kW \cdot hr}$$

$$BSFC_{SS} := 610 \cdot \frac{gm}{kW \cdot hr}$$

$$\text{Energy}_{SS} := BP_{SS} \cdot time_{SS}$$

$$\text{Energy}_{SS} = 2 \times 10^4 \ J$$

$$\text{Energy}_{Blip} := BP_{Blip} \cdot time_{Blip}$$

$$\text{Energy}_{Blip} = 9.375 \times 10^3 \ J$$

$$\text{Energy}_{Dip} := BP_{Dip} \cdot time_{Dip}$$

$$\text{Energy}_{Dip} = 1.031 \cdot 10^4 \ J$$

$$\text{Energy}_{Dither} := \text{Energy}_{Blip} + \text{Energy}_{Dip}$$

-continued $$\text{Energy}_{Dither} = 1.969 \times 10^4 \ J$$

$$\text{FuelUsed}_{Blip} := BSFC_{Blip} \cdot BP_{Blip} \cdot time_{Blip}$$

$$\text{FuelUsed}_{Blip} = 1.354 \cdot gm$$

$$\text{FuelUsed}_{Dip} := BSFC_{Dip} \cdot BP_{Dip} \cdot time_{Dip}$$

$$\text{FuelUsed}_{Dip} = 1.762 \cdot gm$$

$$\text{FuelUsed}_{SS} := BSFC_{SS} \cdot BP_{SS} \cdot time_{SS}$$

$$\text{FuelUsed}_{SS} = 3.389 \cdot gm$$

$$\frac{\text{FuelUsed}_{SS}}{\text{FuelUsed}_{Blip} + \text{FuelUsed}_{Dip}} = 1.088$$

about 9% better fuel economy

As shown in the foregoing example, a nine percent improvement in fuel economy is achieved. However, the pulsed cruise system may be optimized such that a greater improvement in fuel economy may be achieved.

Although the description above contains many specificities, these should not be construed as limiting the scope of the inventions but as merely providing illustrations of some of the presently preferred embodiments. Therefore, it will be appreciated that the scope of the present inventions fully encompasses other embodiments which may become obvious to those skilled in the art, and that the scope of the present inventions are accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the inventions, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

It is understood that any specific order or hierarchy or steps in the processes disclosed herein are merely exemplary illustrations and approaches. Based upon design preferences, it is understood that any specific order or hierarchy of steps in the process may be re-arranged. Some of the steps may be performed simultaneously.

The previous description is provided to enable persons of ordinary skill in the art to practice the various aspects described herein. Various modifications to these aspects will be readily apparent to those skilled in the art, and the general principles defined herein may be applied to other aspects. Thus, the claims are not intended to be limited to the aspects shown herein, but are to be accorded the full scope consistent with the claim language. Headings and subheadings, if any, are used for convenience only and do not limit the inventions. All structural and functional equivalents to the elements of the various aspects described throughout the disclosure that are known or later come to be known to those of ordinary skill in the art are intended to be encompassed by the inventions.

What is claimed is:

1. A computer-implemented method of conserving energy used by a device, the computer-implemented method comprising:
   receiving, by a computer system, as an input to an energy controller a first function comprising a first work output of a device over a time period;
   processing, by a processor of the computer system, the first function into a second function comprising a second work output of the device over the time period;
   wherein the second function has a plurality of regions of equal or increased work output relative to the first work output;
   wherein the second function has a plurality of regions of decreased work output relative to the first work output;
   wherein, when the device outputs work equal to the second work output over the time period, the device consumes less energy than the device would consume if the device outputted work equal to the first work output over the time period;
   wherein the second function comprises cyclical oscillations between the plurality of regions of equal or increased work output and the plurality of regions of decreased work output that comprise a same waveform;
   wherein the device performs substantially the same amount of work under the second work output over the time period as the device would perform under the first work output over the time period; and
   directing, by the computer system, the device to output work according to the second work output over the time period;
   wherein the computer system comprises the processor and an electronic storage medium.

2. The method of claim 1, further comprising supplementing an output of the device with output generated by a generator while the device outputs work according to the second work output.

3. The method of claim 1, further comprising processing the second function for smoothness.

4. The method of claim 1, wherein the device comprises at least one of a display screen, a computer, an electronic device, an appliance, an air conditioning system, a heating system, a pump system, and a light emitter.

5. The method of claim 1, wherein the processing of the first function into the second function comprises application of a transform T, such that $F_2(n) = T\, F_1(n)$, where
   $F_2$ is the second function;
   $F_1$ is the first function; and
   n is an ordered index number of an nth discrete sample, where $n \in \{0, 1, 2, \ldots \infty\}$; and
   wherein T comprises $k e^{-2\pi i \Omega(n-d)} - Z$, where
   k is a scalar;
   e is an exponential;
   i is the imaginary number $\sqrt{-1}$;
   $\Omega$ is a frequency of cycles per sample interval;
   Z is a constant; and
   d is a delay constant.

6. The method of claim 1, wherein the processing of the first function into the second function comprises application of a transform T, such that $F_2(n) = T + F_1(n)$, where
   $F_2$ is the second function;
   $F_1$ is the first function; and
   n is an ordered index number of an nth discrete sample, where $n \in \{0, 1, 2, \ldots \infty\}$; and
   wherein T comprises $$\frac{a_0}{2} + \sum_{j=1}^{\infty} [a_j \cos(j 2\pi \Omega n) + b_j \sin(j 2\pi \Omega n)],$$

where
   j is an ordered index number, where $j \in \{0, 1, 2, \ldots \infty\}$;
   $a_j$ is a series of real numbers;
   $a_0$ is a real number;
   $b_j$ is a series of real numbers; and
   $\Omega$ is a frequency in cycles per sample interval.

7. The method of claim 1, wherein the processing of the first function into the second function comprises application of a transform T, such that $F_2(n) = T + F_1(n)$, where
   $F_2$ is the second function;
   $F_1$ is the first function; and
   n is an ordered index number of an nth discrete sample, where $n \in \{0, 1, 2, \ldots \infty\}$; and
   wherein T comprises $$\begin{cases} q, & \text{when } n = s_1 \\ r, & \text{when } n = s_2 \end{cases},$$

where
   q is a scalar;
   r is a scalar different from q;
   $s_1$ is a first set of samples of n; and
   $s_2$ is a second set of samples of n different from $s_1$.

8. The method of claim 7, wherein the weighted average of $F_2(n)$ over $s_1 + s_2$ is approximately equal to the weighted average of $F_1(n)$ over $s_1 + s_2$.

9. The method of claim 7, wherein members of the first set of samples alternate with members of the second set of samples.

10. The method of claim 7, wherein q is greater than or equal to 0 and r is less than 0.

11. The method of claim 7, wherein q is greater than 0 and r is less than or equal to 0.

12. The method of claim 7, wherein q is greater than 0 and r is less than 0.

13. The method of claim 1, wherein the same waveform comprises a square wave.

14. A computer-implemented control system comprising:
   a processing module that couples to a device, the processing module configured to:
      receive, by a computer system, a first function comprising a first work output of the device over a time period;
      process, by the computer system, the first function into a second function comprising a second work output of the device over the time period, wherein the second function has a plurality of regions of equal or increased work output and a plurality of regions of decreased work output, relative to the first work output;
      wherein, when the device outputs work equal to the second work output over the time period, the device consumes less energy than the device would have consumed if the device outputted work equal to the first work output over the time period;
      wherein the second function comprises cyclical oscillations between the plurality of regions of equal or increased output and the plurality of regions of decreased work output that comprise a same waveform;

wherein the device performs substantially the same amount of work under the second work output over the time period as the device would perform under the first work output over the time period; and output, by the computer system, the second function such that the device outputs work according to the second work output over the time period;

wherein the computer system comprises a computer processor configured to execute modules and an electronic storage medium configured to store the modules.

15. The control system of claim 14, further comprising an override switch configured to allow a user to select an override of the energy savings.

16. The control system of claim 14, wherein the device comprises at least one of a display screen, a computer, an electronic device, an appliance, an air conditioning system, a heating system, a pump system, and a light emitter.

17. The control system of claim 14, wherein the processing of the first function into the second function comprises application of a transform T, such that $F_2(n)=T \, F_1(n)$, where $F_2$ is the second function;
$F_1$ is the first function; and
n is an ordered index number of an nth discrete sample, where $n \in \{0, 1, 2, \ldots \infty\}$; and
wherein T comprises $ke^{-2\pi i \Omega(n-d)} - Z$, where k is a scalar;
e is an exponential;
i is the imaginary number $\sqrt{-1}$;
$\Omega$ is a frequency of cycles per sample interval;
Z is a scalar; and
d is a delay scalar.

18. The control system of claim 14, wherein the processing of the first function into the second function comprises application of a transform T, such that $F_2(n)=T+F_1(n)$, where $F_2$ is the second function;
$F_1$ is the first function; and
n is an ordered index number of an nth discrete sample, where $n \in \{0, 1, 2, \ldots \infty\}$; and
wherein T comprises $$\frac{a_0}{2} + \sum_{j=1}^{\infty} [a_j \cos(j2\pi\Omega n) + b_j \sin(j2\pi\Omega n)],$$

where
j is an ordered index number, where $j \in \{0, 1, 2, \ldots \infty\}$;
$a_j$ is a series of real numbers;
$a_0$ is a real number,
$b_j$ is a series of real numbers; and
$\Omega$ is a frequency in cycles per sample interval.

19. The control system of claim 14, wherein the processing of the first function into the second function comprises application of a transform T, such that $F_2(n)=T+F_1(n)$, where $F_2$ is the second function;
$F_1$ is the first function; and
n is an ordered index number of an nth discrete sample, where $n \in \{0, 1, 2, \ldots \infty\}$; and
wherein T comprises $$\begin{cases} q, & \text{when } n = s_1 \\ r, & \text{when } n = s_2 \end{cases},$$

where
q is a scalar;
r is a scalar different from q;
$s_1$ is a first set of samples of n; and
$s_2$ is a second set of samples of n different from $s_1$.

20. A computer-implemented method of conserving energy used by a device, the computer-implemented method comprising:

receiving, by a computer system, as an input to an energy controller a first function comprising a first work output of a device over a time period;

using a computer-executable instruction, processing, by the computer system, the first function into a second function comprising a second work output of the device over the time period;

wherein the second function has a plurality of regions of equal or increased work output relative to the first work output;

wherein the second function has a plurality of regions of decreased work output relative to the first work output;

wherein, when the device outputs work equal to the second work output over the time period, the device consumes less energy than the device would have consumed if the device outputted work equal to the first work output over the time period;

wherein the second function comprises cyclical oscillations between the plurality of regions of equal or increased work output and the plurality of regions of decreased work output that comprise a same waveform;

wherein the device performs substantially the same amount of work under the second work output over the time period as the device would perform under the first work output over the time period; and directing, by the computer system, the device to output work according to the second work output over the time period;

wherein the computer system comprises a computer processor and an electronic storage medium configured to store the computer-executable instruction.

* * * * *

UNITED STATES PATENT AND TRADEMARK OFFICE
CERTIFICATE OF CORRECTION

Page 1 of 1

PATENT NO. : 8,639,430 B2
APPLICATION NO. : 12/986128
DATED : January 28, 2014
INVENTOR(S) : Jeffrey N. Yu, James W. Hill and Gregory W. Davis It is certified that error appears in the above-identified patent and that said Letters Patent is hereby corrected as shown below:

In the Specification

In column 1 at line 9, Change "Jan. 6, 1010;" to --Jan. 6, 2010;--.

In column 14 at line 53, Change "$T_n$," to --$T_m$--.

In column 23 at line 52, Change "q." to --q,--.

In column 23 at line 67, Change "$F_1(n)$" to --$F_2(n)$--.

In the Claims

In column 27 at line 59, In Claim 5, change "constant;" to --scalar;--.

In column 27 at line 60, In Claim 5, change "constant." to --scalar.--.

In column 28 at line 11, In Claim 6, change "number," to --number;--.

In column 28 at line 65, In Claim 14, after "increased" insert --work--.

In column 29 at line 31, In Claim 17, change "of" to --in--.

In column 29 at line 51, In Claim 18, change "number," to --number;--.

Signed and Sealed this
Seventeenth Day of February, 2015

Michelle K. Lee
*Deputy Director of the United States Patent and Trademark Office*